US008011574B2

(12) United States Patent
Hutchison et al.

(10) Patent No.: US 8,011,574 B2
(45) Date of Patent: Sep. 6, 2011

(54) METHOD AND APPARATUS FOR ORDERING GOODS, SERVICES AND CONTENT OVER AN INTERNETWORK

(75) Inventors: Robin B. Hutchison, Vancouver (CA); Michael T. G. Maydaniuk, Port Moody (CA); George A. Fleming, White Rock (CA); Denis N. Heinrichs, Port Moody (CA); P. Carl Linkletter, Mountlake Terrace, WA (US); Iain M. Begg, Vancouver (CA); Darren W. Hagman, Vancouver (CA); Roberto Dominguez, Vancouver (CA); Jun Huang, Burnaby (CA)

(73) Assignee: eCharge Corporation, Seattle, WA (US)

( * ) Notice: Subject to any disclaimer, the term of this patent is extended or adjusted under 35 U.S.C. 154(b) by 0 days.

(21) Appl. No.: 12/703,589

(22) Filed: Feb. 10, 2010

(65) Prior Publication Data

US 2010/0145816 A1 Jun. 10, 2010

Related U.S. Application Data

(60) Continuation of application No. 11/266,519, filed on Nov. 3, 2005, now Pat. No. 7,669,762, which is a division of application No. 09/755,657, filed on Jan. 5, 2001, now Pat. No. 7,606,355, which is a continuation of application No. 09/299,156, filed on Apr. 22, 1999, now abandoned, which is a continuation-in-part of application No. 09/064,797, filed on Apr. 22, 1998, now abandoned.

(51) Int. Cl.
*G06Q 30/00* (2006.01)
(52) U.S. Cl. .................. 235/379; 235/383; 705/26.1
(58) Field of Classification Search .................. 235/375, 235/376, 379, 380, 383; 705/26.1, 34
See application file for complete search history.

(56) References Cited

U.S. PATENT DOCUMENTS 5,382,983 A 1/1995 Kwoh
(Continued)

FOREIGN PATENT DOCUMENTS

EP 0765068 A2 3/1997
(Continued)

OTHER PUBLICATIONS

English translation by Japanese Associate of Yamamoto, H., "Development of Cyber Business by Integrating Internet Protocol Service With Telephone Service," The Telecommunications Association, NTT Technical Review 10 (1):86-88, Jan. 1998, article originally disclosed in Information Disclosure Statement filed Nov. 5, 2010.

(Continued)

*Primary Examiner* — Andrew Joseph Rudy
(74) *Attorney, Agent, or Firm* — Christensen O'Connor Johnson Kindness PLLC

(57) ABSTRACT

A billing system that allows a consumer to order products from computers connected to the Internet, wherein the consumer is automatically billed for the ordered good or service by its telephone service provider. When a consumer orders a product over the Internet, a plug-in component of the consumer's computer establishes an Internet connection to a billing server. A billing server component transfers an encrypted version of the product to the plug-in component. The plug-in component then disconnects from the Internet and establishes a point-to-point (PPP) connection with the billing server. During the PPP connection, the billing server component transfers an access key assigned to the order to the plug-in component so that the plug-in component may decrypt the product. The consumer is charged a unit rate or "drop-charge" for the product by the telephone service provider when the PPP connection is established using a premium telephone number assigned and administered by the telephone service provider.

15 Claims, 31 Drawing Sheets

U.S. PATENT DOCUMENTS

| | | | |
|---|---|---|---|
| 5,715,314 A | | 2/1998 | Payne |
| 5,729,594 A | * | 3/1998 | Klingman ............. 379/93.12 |
| 5,737,414 A | | 4/1998 | Walker |
| 5,768,382 A | | 6/1998 | Schneier |
| 5,779,549 A | | 7/1998 | Walker |
| 5,794,207 A | | 8/1998 | Walker |
| 5,797,127 A | | 8/1998 | Walker |
| 5,798,508 A | | 8/1998 | Walker |
| 5,799,285 A | * | 8/1998 | Klingman ............. 705/14.51 |
| 5,818,933 A | | 10/1998 | Kambe |
| 5,822,737 A | | 10/1998 | Ogram |
| 5,864,610 A | | 1/1999 | Ronen |
| 5,870,473 A | | 2/1999 | Boesch |
| 5,883,955 A | | 3/1999 | Ronning |
| 5,890,137 A | | 3/1999 | Koreeda |
| 5,901,228 A | | 5/1999 | Crawford |
| 5,905,736 A | | 5/1999 | Ronen |
| 5,909,671 A | | 6/1999 | Byford |
| 5,950,172 A | | 9/1999 | Klingman |
| 5,978,775 A | | 11/1999 | Chen |
| 5,991,738 A | | 11/1999 | Ogram |
| 6,023,499 A | * | 2/2000 | Mansey et al. ............. 379/111 |
| 6,047,268 A | | 4/2000 | Bartoli |
| 6,058,250 A | | 5/2000 | Harwood |
| 6,058,258 A | * | 5/2000 | Cullum et al. ............. 703/2 |
| 6,113,495 A | | 9/2000 | Walker |
| 6,161,133 A | | 12/2000 | Kikinis |
| 6,178,240 B1 | | 1/2001 | Walker |
| 6,247,047 B1 | | 6/2001 | Wolff |
| 6,249,865 B1 | * | 6/2001 | Walker et al. ............. 713/155 |
| 6,460,076 B1 | * | 10/2002 | Srinivasan ............. 709/219 |
| 6,490,567 B1 | | 12/2002 | Gregory |
| 6,493,685 B1 | | 12/2002 | Ensel |
| 6,570,870 B1 | * | 5/2003 | Berstis ............. 370/352 |
| 6,584,309 B1 | | 6/2003 | Whigham |
| 6,594,692 B1 | | 7/2003 | Reisman |
| 6,622,169 B2 | | 9/2003 | Kikinis |
| 6,650,633 B1 | | 11/2003 | Albers |
| 6,769,009 B1 | | 7/2004 | Reisman |
| 6,771,317 B2 | | 8/2004 | Ellis |
| 6,823,318 B1 | | 11/2004 | Creswell |
| 6,889,205 B1 | | 5/2005 | Lamm |
| 6,973,622 B1 | | 12/2005 | Rappaport |
| 6,993,572 B2 | | 1/2006 | Ross, Jr. |
| 7,035,824 B2 | * | 4/2006 | Nel ............. 705/42 |
| 7,051,072 B2 | | 5/2006 | Stewart |
| 7,072,856 B1 | | 7/2006 | Nachom |
| 7,076,458 B2 | * | 7/2006 | Lawlor et al. ............. 705/35 |
| 7,080,049 B2 | | 7/2006 | Truitt |
| 7,080,051 B1 | | 7/2006 | Crawford |
| 7,110,978 B1 | | 9/2006 | Chin |
| 7,134,131 B1 | | 11/2006 | Hendricks |
| 7,143,147 B1 | | 11/2006 | Hickman |
| 7,143,148 B1 | | 11/2006 | Hickman |
| 7,143,186 B2 | | 11/2006 | Stewart |
| 7,248,675 B2 | | 7/2007 | Mirashrafi |
| 7,266,499 B2 | | 9/2007 | Surace |
| 7,340,045 B2 | | 3/2008 | Felger |
| 7,386,477 B2 | | 6/2008 | Fano |
| 7,451,103 B1 | * | 11/2008 | Boyle et al. ............. 705/35 |
| 7,620,565 B2 | * | 11/2009 | Abelow ............. 705/10 |
| 7,672,892 B2 | * | 3/2010 | Odom et al. ............. 705/37 |
| 7,818,399 B1 | | 10/2010 | Ross, Jr. |

FOREIGN PATENT DOCUMENTS

| | | |
|---|---|---|
| EP | 0818907 A2 | 1/1998 |
| JP | 9-91132 A | 4/1997 |
| JP | 9-114787 A | 5/1997 |
| JP | 9-114904 A | 5/1997 |
| JP | 9-153964 A | 6/1997 |
| JP | 9-179912 A | 7/1997 |
| JP | 9-259189 A | 10/1997 |
| JP | 9-305682 A | 11/1997 |
| JP | 10-3501 A | 1/1998 |
| WO | 96/37848 A1 | 11/1996 |
| WO | 97/01920 A1 | 1/1997 |
| WO | 97/29584 A1 | 8/1997 |

OTHER PUBLICATIONS

Notice of Reasons for Rejection mailed Apr. 20, 2010, in related JP Application No. 2000-547567, filed Apr. 22, 1999, 2 pages.

Ajluni, C., "Security Techniques Ensure Privacy," Electronic Design, Apr. 1995, pp. 83-84.

Alsop, S., "Bookmarks Mark the Next Chapter in the Continuing Story of the War of the Web," InfoWorld 17(37):102, Sep. 11, 1995.

"AT&T eCharge," <https://www.echarge.att.com/index.html>, available at least as early as Oct. 29, 1997.

"AT&T eCharge: Account Activity," <https://www.echarge.att.com/cgi-bin/Transactions.cgi>, available at least as early as Oct. 29, 1997.

"AT&T eCharge: Activate Your Account," <https://www.echarge.att.com/cgi-bin/Activate.cgi>, available at least as early as Oct. 29, 1997.

"AT&T eCharge: Apply for an Account,"https://www.echarge.att.com/cgi-bin/Register.cgi>, available at least as early as Oct. 29, 1997.

"AT&T eCharge: Frequently Asked Questions/Customer Support," <http://www.echarge.att.com/terms_conditions.html>, available at least as early as Oct. 29, 1997.

"AT&T eCharge: How Does It Work?" <http://www.echarge.att.com/how_wk.html>, available at least as early as Oct. 29, 1997.

"AT&T eCharge: Simple," <http://www.echarge.att.com/...>, available at least as early as Oct. 29, 1997.

"Encryption Devices," Government Executive, Jul. 1, 1996, p. 2A.

"Internet 900 Billing Fills Void," Audiotex News, Jan. 1997, p. 5.

"Internet Service Considers 900," Audiotex News, Dec. 1997, p. 8.

Logicom, Inc., "New Web900 Service Offers Secure Billing Over the Internet," News Release, Jul. 1, 1996.

Minkoff, J., "Ensuring Online Security," Discount Merchandiser 36(1):49, Jan. 1996.

Pappalardo, D., "Tools Lets ISPs Charge for Fax, Voice," Network World, Apr. 14, 1997, p. 116.

"Plastic or Cybercash? Cutting Banks out of the Payment Circuit," Electronic Commerce News, vol. 3, No. 42, Oct. 19, 1998, 3 pages.

Sirbu, M.A., "Creating an Open Market for Information," The Journal of Academic Librarianship 21(6):467-471, 1995.

Sweetland, P., "Integrated Billing and the Internet," Telecommunications 31(6):127-130, Jun. 1997.

"Victims Seeking Cheap Online Erotica Aroused by Not-So-Cheap Phone Bills," San Jose Mercury News, Feb. 20, 1997, p. 1C.

Wasserman, T., "Retailers, OSPs Race to Secure Online Sales," Computer Retail Week 7(160):6-7, Jan. 6, 1997.

Wingfield, N., "Netscape Joins Fray with Web Browser for Windows 95," InfoWorld 17(27):37, Jul. 3, 1995.

Notice of Reasons for Rejection mailed Sep. 14, 2010, in related JP Application No. 2000-547567, filed Apr. 22, 1999, 12 pages.

Yamamoto, H. "Development of Cyber Business by Integrating Internet Protocol Service With Telephone Service," The Telecommunications Association, NTT Technical Review 10(1):86-88, Jan. 1998.

"AT&T eCharge: Frequently Asked Questions/Customer Support," <http://www.echarge.att.com/faq.html>, available at least as early as Oct. 29, 1997.

Davenport, G., "New eCHARGE Internet Billing System Charges Purchases to Telephone Bill With AT&T MultiQuest," Business Wire, Dec. 3, 1997, 2 pages.

* cited by examiner

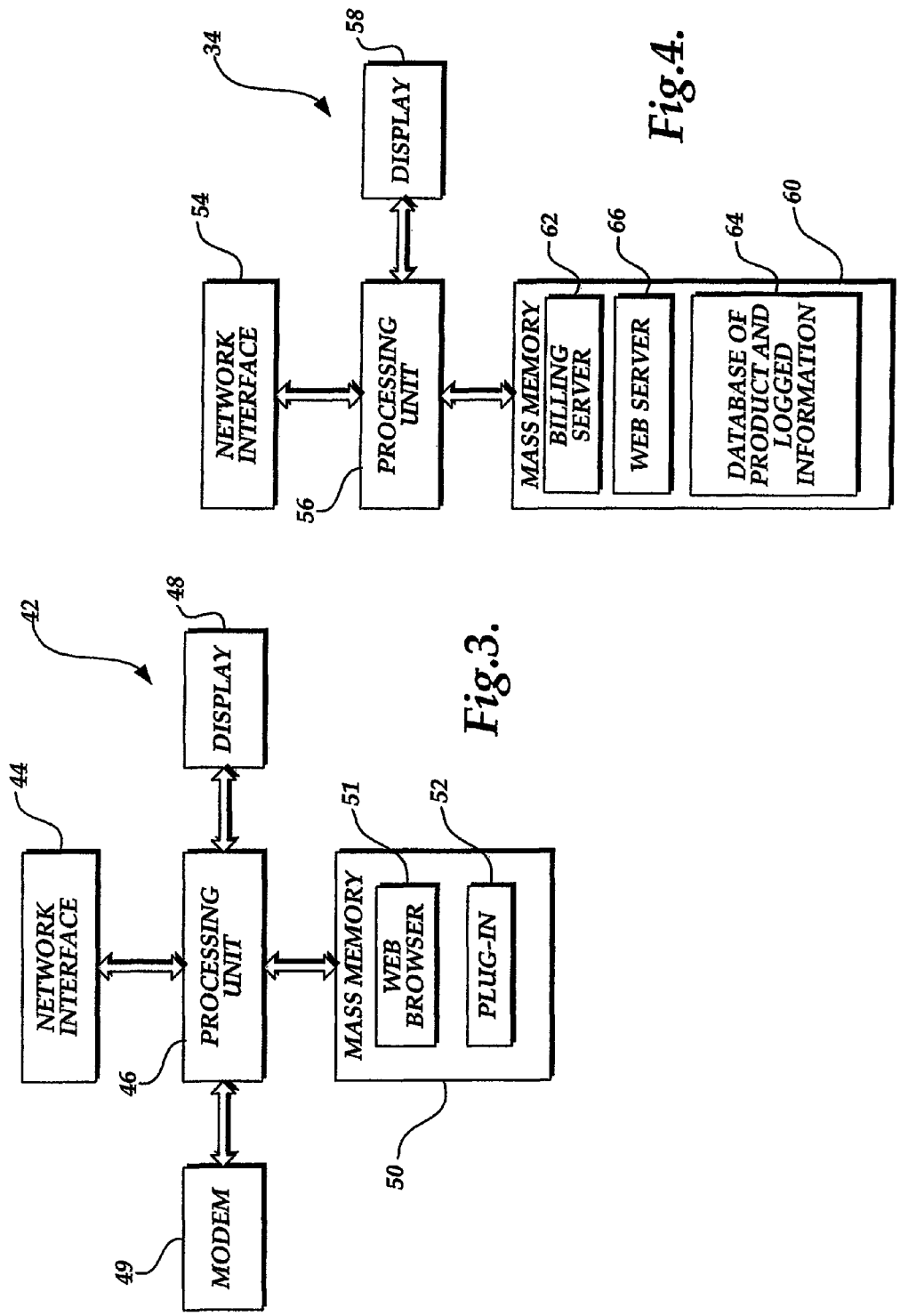

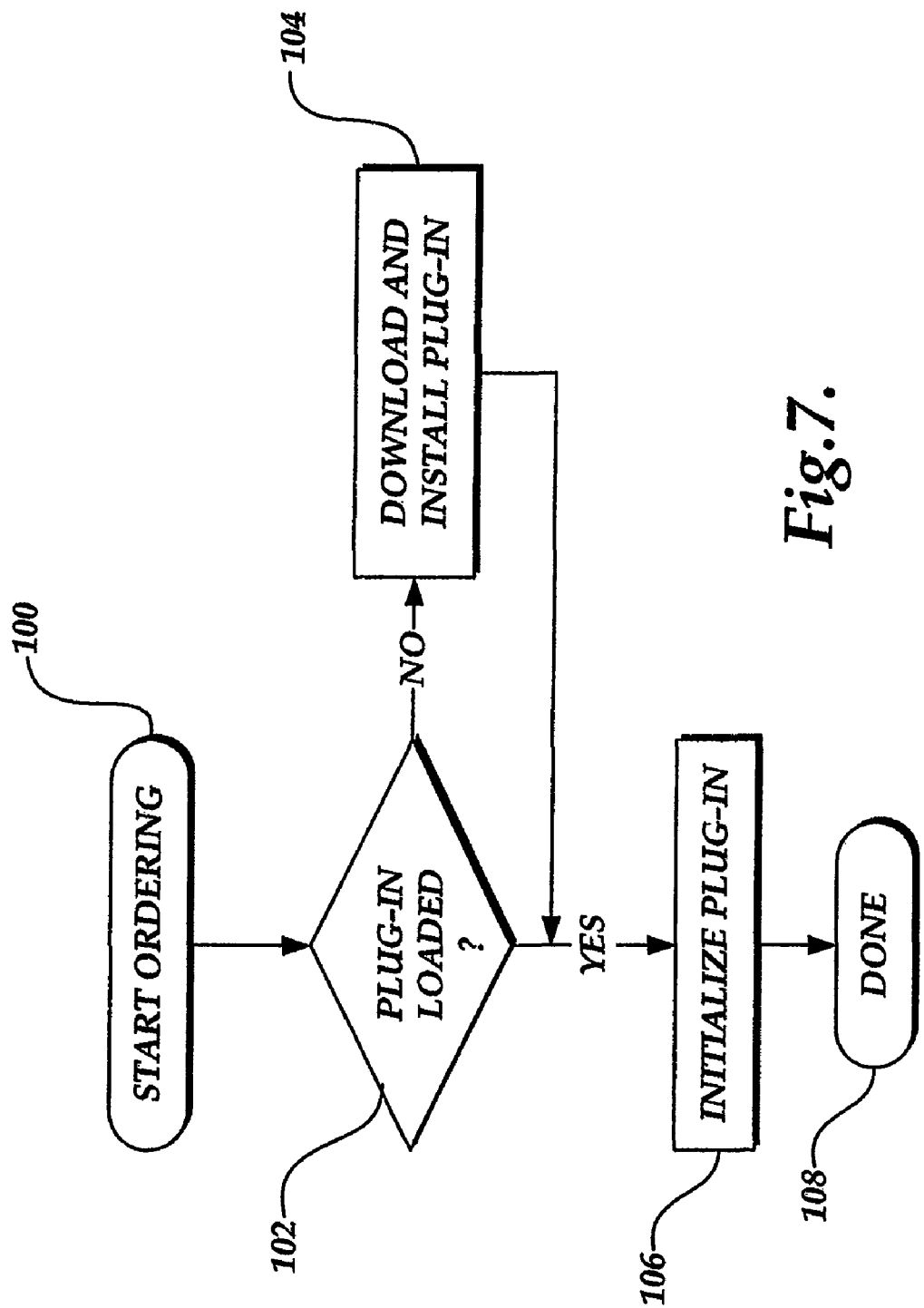

METHOD AND APPARATUS FOR ORDERING GOODS, SERVICES AND CONTENT OVER AN INTERNETWORK

CROSS-REFERENCES TO RELATED APPLICATIONS

This application is a continuation of U.S. application Ser. No. 11/266,519, filed Nov. 3, 2005, which is a divisional of U.S. application Ser. No. 09/755,657, filed Jan. 5, 2001, which is a continuation of U.S. application Ser. No. 09/299,156, filed Apr. 22, 1999, which is a continuation-in-part of U.S. application Ser. No. 09/064,797, filed Apr. 22, 1998, all of which applications are expressly incorporated herein by reference.

FIELD OF THE INVENTION

This invention generally relates to a method and apparatus for allowing a consumer to order goods, services and content from one or more other computers connected via common communication links and, more specifically, a method and apparatus for allowing a consumer to order goods, services and content from computers connected to the Internet, wherein the consumer is automatically billed for the ordered goods, services or content by its telephone service provider.

BACKGROUND

Communication networks are well known in the computer communications field. By definition, a network is a group of computers and associated devices that are connected by communications facilities or links. Network communications can be of a permanent nature, such as via cables, or can be of a temporary nature, such as connections made through telephone or radio links. Networks may vary in size, from a local area network (LAN) consisting of a few computers or workstations and related devices, to a wide area network (WAN), which interconnects computers and LANs that are geographically dispersed, to a remote access service (RAS), which interconnects remote computers via temporary communication links. An internetwork, in turn, is the joining of multiple computer networks, both similar and dissimilar, by means of gateways or routers that facilitate data transfer and conversion from various networks. A well-known abbreviation for the term internetwork is "internet." As currently understood, the capitalized term "Internet" refers to the collection of networks and routers that use the Transmission Control Protocol/Internet Protocol (TCP/IP) to communicate with one another.

A representative section of the Internet 20 is shown in FIG. 1 (Prior Art) in which a plurality of local area networks (LANs) 24 and a wide area network (WAN) 26 are interconnected by routers 22. The routers 22 are generally special purpose computers used to interface one LAN or WAN to another. Communication links within the LANs may be twisted wire pair, or coaxial cable, while communication links between networks may utilize 56 Kbps analog telephone lines, or 1 Mbps digital T-1 lines and/or 45 Mbps T-3 lines. Further, computers and other related electronic devices can be remotely connected to either the LANs 24 or the WAN 26 via a modem and temporary telephone link. Such computers and electronic devices 28 are shown in FIG. 1 as connected to one of the LANs 24 via a dotted line. It will be appreciated that the Internet comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the World Wide Web (WWW). The WWW is a vast collection of interconnected or "hypertext" documents written in HyperText Markup Language (HTML) that are electronically stored at "Web sites" throughout the Internet. A Web site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a Web site elsewhere on the Internet. Each hyperlink is associated with a Uniform Resource Locator (URL) that provides the exact location of the linked document on a server connected to the Internet and describes the document. Thus, whenever a hypertext document is retrieved from any Web server, the document is considered to be retrieved from the WWW.

A consumer is allowed to retrieve hypertext documents from the WWW, i.e., a consumer is allowed to "surf the Web," via a Web browser. A Web browser, such as Netscape's Navigator or Microsoft's Internet Explorer, is a software program implemented by a Web client, i.e., the consumer's computer, to provide a graphical user interface to the WWW. Upon request from the consumer via the Web browser, the Web client accesses and retrieves the desired hypertext document from the appropriate Web server using the URL for the document and a protocol known as HyperText Transfer Protocol (HTTP). HTTP is a higher-level protocol then TCP/IP and is designed specifically for the requirements of the WWW. It is used on top of TCP/IP to transfer hypertext documents between servers and clients.

At the advent of the WWW, the information stored on the Internet was freely transferred back and forth between those parties interested in the information. However, the WWW is quickly becoming a channel of commerce whereby a vast number and array of companies have developed their own Web sites for advertising and selling their goods and services. Consumers may "visit the Web site" of a company, i.e., retrieve the hypertext documents located on the Web server of a particular company, and order any good or service the company has to offer. If that good or service is in the form of electronically stored information, such as a book, a video, a music CD, a computer game, etc., the consumer may simply download the good or service from the company's Web site to his or her computer for immediate consumption and use. If the good or service is of a more tangible nature, such as an appliance or article of clothing ordered from an on-line catalog, a more conventional method of delivery, e.g., the postal service, is used. The traditional method of payment for such goods and services has been by major credit card, wherein the consumer is required to transmit his or her credit information over the Internet to the company's Web site. However, many question the security and confidentiality of such electronic transmissions. Furthermore, many consumers do not have a major credit card with which to make such purchases. Alternative billing systems, such as providing credit information by facsimile or postal service, are much less convenient and often prove enough of a barrier to prohibit the sale altogether. Finally, the traditional methods of billing and payment do not adequately protect the seller or consumer from fraudulent purchases.

In addition to goods and services, many companies also wish to provide consumers with "premium content," i.e., hypertext documents and other electronically stored and transferable information considered to have a monetary value to the company. Examples of such premium content may include magazine articles, proprietary databases, movies, stock information, radio broadcasts, etc. The traditional method of payment for accessing such content has also been by major credit card, wherein the consumer pays for a subscription to the content and is required to transmit his or her credit information over the Internet to the company's Web site. Again, this method billing and payment does not adequately protect the seller or consumer from fraudulent purchases and does not provide the consumer with adequate security.

Accordingly, a more effective method and apparatus for ordering and billing for goods, services and content over a network, and ultimately the Internet, is needed. The method and apparatus should provide for automatic billing to the consumer without the need of a credit card or transferring any sensitive credit information via the Internet. In addition, the consumer should be allowed to use the purchased good or service, if downloaded, only after billing is completed. Finally, the method and apparatus should prevent consumers with histories of nonpayment from purchasing additional goods, services and/or content.

SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

The present invention provides a computer program for ordering products, including goods, services and content, from computers connected to the Internet, wherein the consumer is automatically billed for the ordered good, service or content by its telephone service provider. In one actual embodiment of the invention, the billing system comprises a plug-in component and a billing server component. When a consumer orders a product over the Internet, the plug-in component establishes an Internet connection to a billing server located elsewhere on the Internet. In response, the billing server component transfers a transaction I.D. identifying the order to the plug-in component. The plug-in component then disconnects from the Internet and establishes a point-to-point (PPP) connection with the billing server. Once the PPP connection is established, the plug in component transfers the transaction I.D. back to the billing server component. The billing server component then transfers the access key assigned to the order identified by the transaction I.D. to the plug-in component. The consumer uses the access key to claim the ordered product. The consumer is charged for the product automatically by the telephone service provider when the PPP connection is established using a telephone number assigned and administered by the telephone service provider.

In accordance with yet other aspects of the present invention, the billing server component also transfers an encrypted version of the ordered product to the plug-in component before the plug-in components disconnects from the Internet. The plug-in component then uses the access key to decrypt the encrypted version of the product.

In another embodiment of the present invention, the billing system comprises a plug-in component, a billing server component and a merchant server component for ordering products, such as premium content, over the Internet for which the consumer will be billed at a per minute rate for accessing the content. When the consumer orders the product over the Internet, the plug-in component establishes a premium telephone communication link to a billing server located elsewhere on the Internet and transfers the order for the product to the billing server. The billing server component then establishes an Internet connection with a merchant server capable of providing the ordered product and forwards the order for the product to the merchant server. In response, the merchant server component supplies the billing server component and the plug-in component with the information necessary for the plug-in component to locate and access the ordered product. The consumer is then charged for the ordered product by the telephone service provider as the consumer accesses the ordered product during the premium telephone communication link with the billing server. More specifically, the consumer is charged for the duration of the premium telephone link at a predetermined rate associated with the ordered product and the premium telephone communication link.

In accordance with yet other aspects of the present invention, the billing server component provides the plug-in component with a premium telephone number and the predetermined rate at which the consumer will be billed for the ordered product via an Internet connection established with the billing server prior to the establishing of the premium telephone communication link with the billing server.

A method and an apparatus capable of performing actions generally consistent with the plug-in component, billing server component and merchant component described above represent further aspects of the present invention.

DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein:

FIG. 3 is a block diagram of the several components of the consumer's computer shown in FIG. 2 that is used to order goods, services and content from the Internet in accordance with the present invention;

FIG. 4 is a block diagram of the several components of a billing server shown in FIG. 2 that is used to supply the ordered good, service and/or location of the content and confirm the order in accordance with the present invention;

FIG. 7 is a flow chart illustrating the logic used by the consumer's computer to initiate an order of a good and/or service from the Internet;

DETAILED DESCRIPTION

Figure 1:
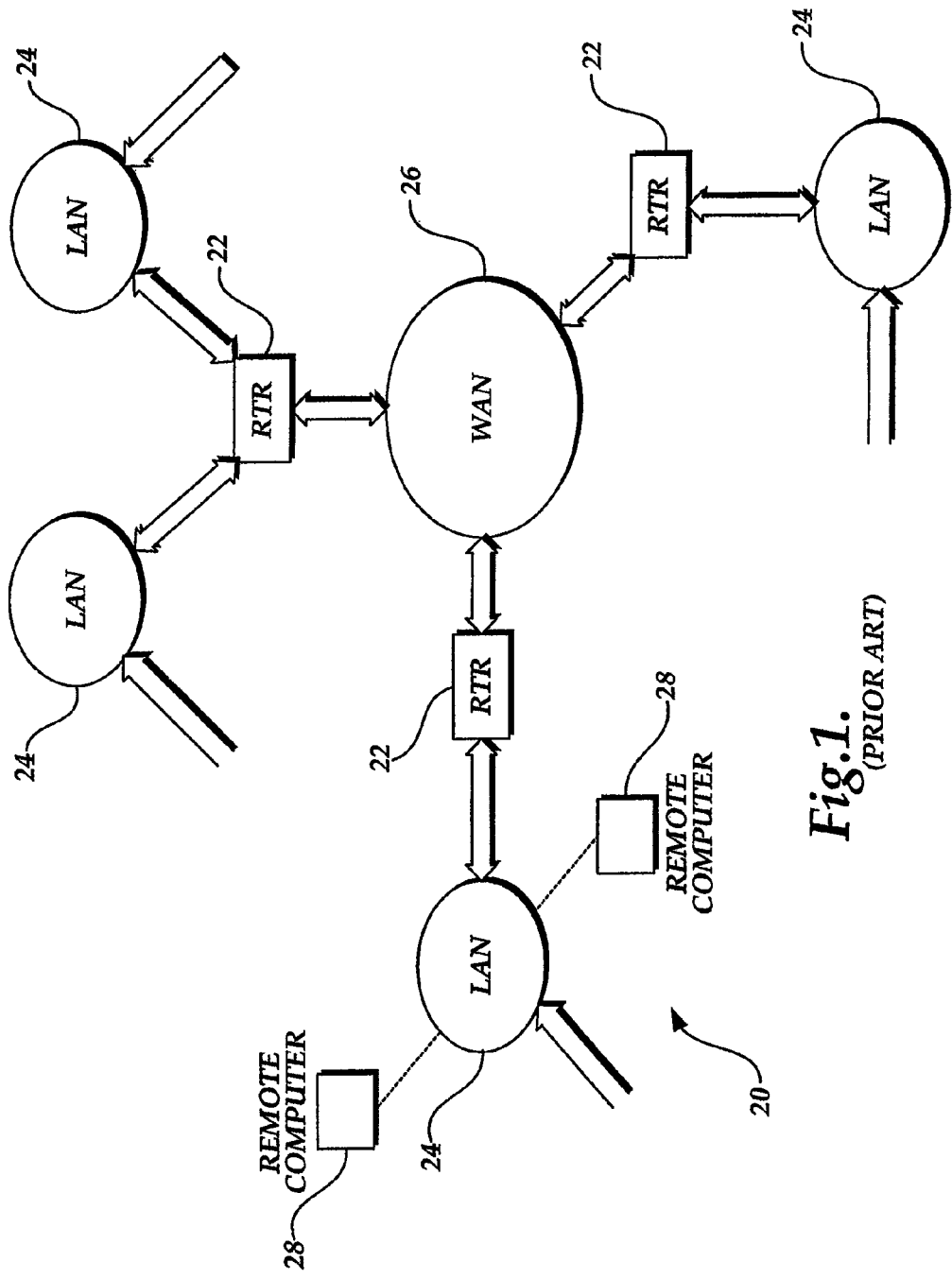
FIG. 1 (Prior Art) is a block diagram of a representative portion of the Internet.

As previously described and shown in FIG. 1, the Internet 20 is a collection of local area networks and (LANs) 24, wide area networks (WANs) 26, remote computers 28 and routers 22 that use the Transmission Control Protocol/Internet Protocol (TCP/IP) to communicate with each other. The World Wide Web (WWW), on the other hand, is a vast collection of interconnected, electronically stored information located on servers connected throughout the Internet 20. Many companies are now selling goods, services and access to their premium content over the Internet using the WWW. In accordance with the present invention, a consumer orders goods, services and/or content (referred to interchangeably herein as "products") over the Internet 20 via a Web browser and is automatically billed for the purchase on his or her monthly telephone bill. More specifically, the consumer places an order for goods, services, or premium content from a computer 42 connected to the Internet 20. The order is processed and confirmed by a billing server 34 connected to a LAN 24 located elsewhere in the Internet 20, which obtains the product from a merchant server 39, i.e., a server owned by the merchant which sponsors or sells the product, also located elsewhere in the Internet 20.

Figure 2:
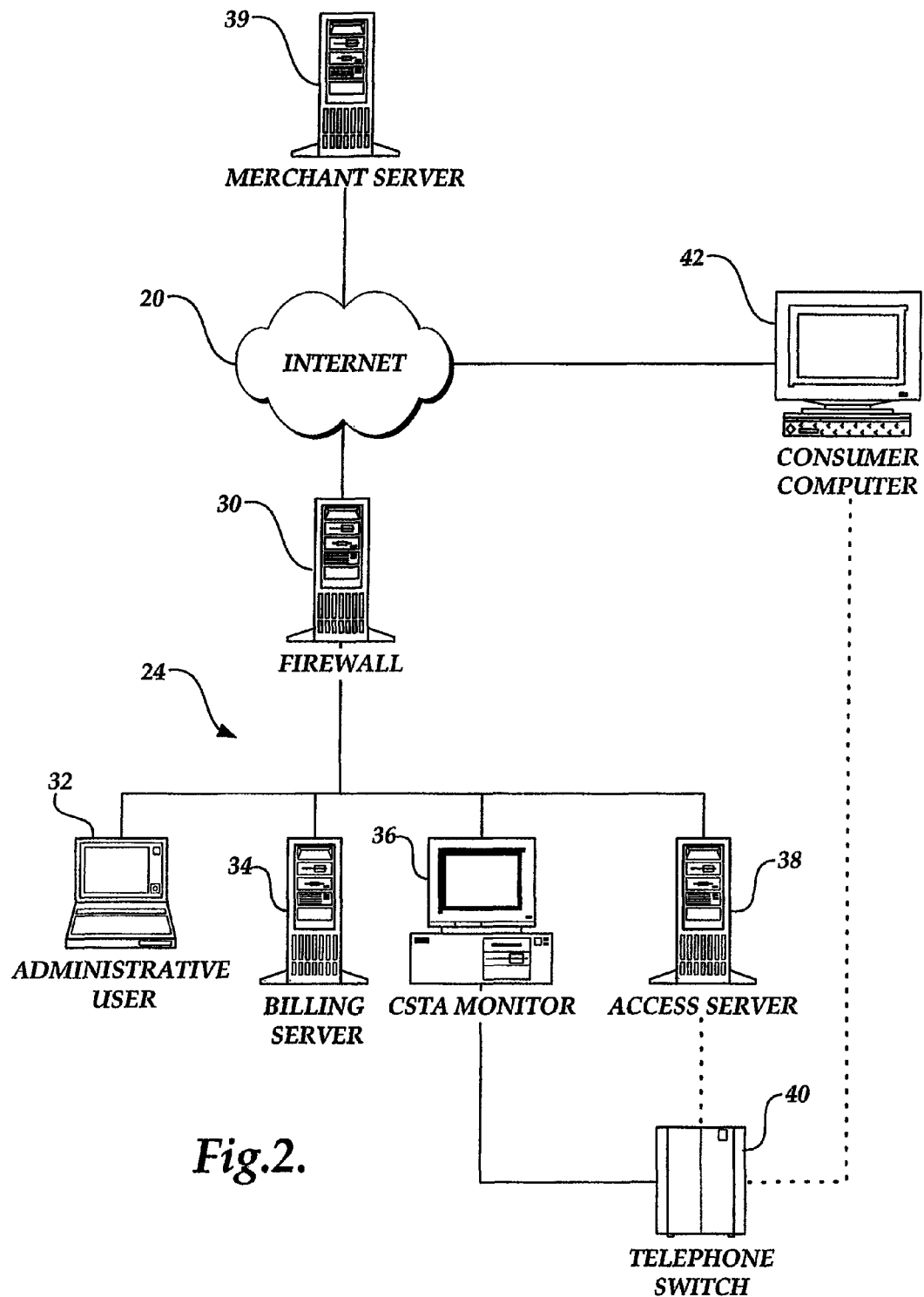
FIG. 2 is a pictorial diagram of a local area network (LAN) connected to the Internet, which supplies goods, services and content ordered by a consumer using a computer located elsewhere on the Internet in accordance with the present invention.

The LAN 24 to which the billing server 34 is connected and to which the consumer's computer 42 has established an Internet connection for ordering a product is shown in more detail in FIG. 2. In addition to the billing server 34, the LAN 24 includes an administrative computer 32 used to administer product, vendor, and purchaser information and services provided by the billing server 34. The LAN 24 also includes an access server 38 equipped with a plurality of high-speed digital modems used to accept temporary telephone links from other computers located in the Internet 20, such as the consumer's computer 42. Finally, LAN 24 includes a personal computer 36 installed with a computer supported telephony application (CSTA), which is a standard protocol used in North America to interface the computer 36 with a telephone switch 40. However, those of ordinary skill in the art will appreciate that in other embodiments of the present invention, the access server 38 is itself equipped with computer telephony/caller identification software that is appropriate for the particular telephone system in which the telephone switch 40 is operative. Consequently, it will be appreciated that in these embodiments, the CSTA monitor 36 is unnecessary.

As will be described in more detail below, after the consumer places an order using the computer 42 via the Internet 20, the consumer's computer disconnects from the Internet 20 and establishes a point-to-point (PPP) connection with the billing server 34 to confirm the purchase. More specifically, the consumer's computer places a telephone call to a premium telephone number assigned to the telephone switch 40. The telephone switch routes the premium telephone call to the access server 38, whose modems answer the telephone call and notify the billing server 34 that a TCP/IP connection to the consumer's computer 42 has been established. Meanwhile, the CSTA monitor 36 that monitors the telephone switch 40 also notifies the billing server 34 that the telephone call has been made, thus completing the PPP connection between the billing server 34 and the consumer's computer 42. In those embodiments of the present invention, which do not include a CSTA monitor 36, it will be appreciated that the computer telephony software resident on the access server 38 provides this function.

In the actual embodiment of the present invention shown in FIG. 2, the LAN 24 is insulated from the Internet 20 by a firewall server 30, which tracks and controls the flow of all data passing through it using the TCP/IP protocol. The firewall 30 protects the LAN 24 from malicious in-bound data traffic. The LAN 24 is a bus network interconnecting the various computers and servers. The LAN 24 shown in FIG. 2 can be formed of various coupling media such as glass or plastic fiberoptic cables, coaxial cables, twisted wire pair cables, ribbon cables, etc. In addition, one of ordinary skill in the art will appreciate that the coupling medium can also include a radio frequency coupling media or other intangible coupling media. Any computer system or number of computer systems, including but not limited to workstations, personal computers, laptop computers, servers, remote computers, etc., that is equipped with the necessary interface hardware may be connected temporarily or permanently to the LAN 24 and, thus, the Internet 20. However, if temporarily connected via a telephone link to another device connected to the LAN 24, the interface hardware of both the remote computer 28 and the device to which it is connected must contain a modem. Finally, those of ordinary skill in the art will recognize that while only one consumer computer 42, one billing server 34 and one merchant server 39 are depicted in FIG. 2, numerous consumer computers, billing servers and merchant servers equipped with the hardware and software components described below may be connected to the Internet 20.

Relevant Consumer Computer, Billing Server and Merchant Server Components

FIG. 3 depicts several of the key components of the consumer's computer 42. Those of ordinary skill in the art will appreciate that the consumer's computer 42 includes many more components then those shown in FIG. 3. However, it is not necessary that all of these generally conventional components be shown in order to disclose an illustrative embodiment for practicing the present invention. As shown in FIG. 3, the consumer's computer includes a network interface 44 for connecting to a LAN 24 or WAN 26, or for connecting remotely to a LAN or WAN. Those of ordinary skill in the art will appreciate that the network interface 44 includes the necessary circuitry for such a connection and is also constructed for use with the TCP/IP protocol, the particular network configuration of the LAN or WAN it is connecting to, and a particular type of coupling medium.

The consumer's computer 42 also includes a processing unit 46, a display 48, a modem 49 and a memory 50. The memory 50 generally comprises a random access memory (RAM), a read-only memory (ROM) and a permanent mass storage device, such as a disk drive. The memory 50 stores the program code and data necessary for ordering a product over the Internet 20 in accordance with the present invention. More specifically, the memory 50 stores a plug-in component 52, 52' and/or 52" formed in accordance with the present invention for ordering products. It will be appreciated that this component may be stored on a computer-readable medium and loaded into memory 50 of the consumer computer 42 using a drive mechanism associated with the computer-readable medium, such as a floppy or CD-ROM drive. The memory 50 also includes a Web browser 51, such as Netscape's Navigator or Microsoft's Internet Explorer browsers.

As will be described in more detail below, the products ordered by the consumer are supplied by a remote server, i.e., the billing server 34 located elsewhere on the Internet, e.g., in LAN 24 illustrated in FIG. 2. FIG. 4 depicts several of the key components of the billing server 34. Those of ordinary skill in the art will appreciate that the billing server 34 includes many more components then those shown in FIG. 4. However, it is not necessary that all of these generally conventional components be shown in order to disclose an illustrative embodiment for practicing the present invention. As shown in FIG. 4, the billing server 34 is connected to the LAN 24 via a network interface 54. Those of ordinary skill in the art will appreciate that the network interface 54 includes the necessary circuitry for connecting the billing server 34 to the LAN 24 and the firewall 30, and is constructed for use with the TCP/IP protocol, the bus network configuration of the LAN 24, and the particular type of coupling medium.

The billing server 34 also includes a processing unit 56, a display 58, and a mass memory 60. The mass memory 60 generally comprises a random access memory (RAM), read-only memory (ROM), and a permanent mass storage device, such as a hard disk drive, tape drive, optical drive, floppy disk drive, or combination thereof. The mass memory 60 stores the program code and data necessary for supplying products to consumers in accordance with the present invention. More specifically, the mass memory 60 stores a billing server component 62 and/or 62' formed in accordance with the present invention for supplying the ordered products and confirming the order of products. In addition, mass memory 60 stores a database 64 of product information continuously logged by the billing server 34 regarding vendors, consumers and products. It will be appreciated by those of ordinary skill in the art that the database 64 of product and logged information may also be stored on other servers or storage devices connected to the LAN 24. It will be appreciated that the billing server component 62, 62' and database 64 of product information may be stored on a computer-readable medium and loaded into mass memory 60 of the billing server 34 using a drive mechanism associated with the computer-readable medium, such as floppy or CD-ROM drive. Finally, mass memory 60 stores Web server software 66 for handling requests for stored information received via the Internet 20 and the WWW.

Figure 5:
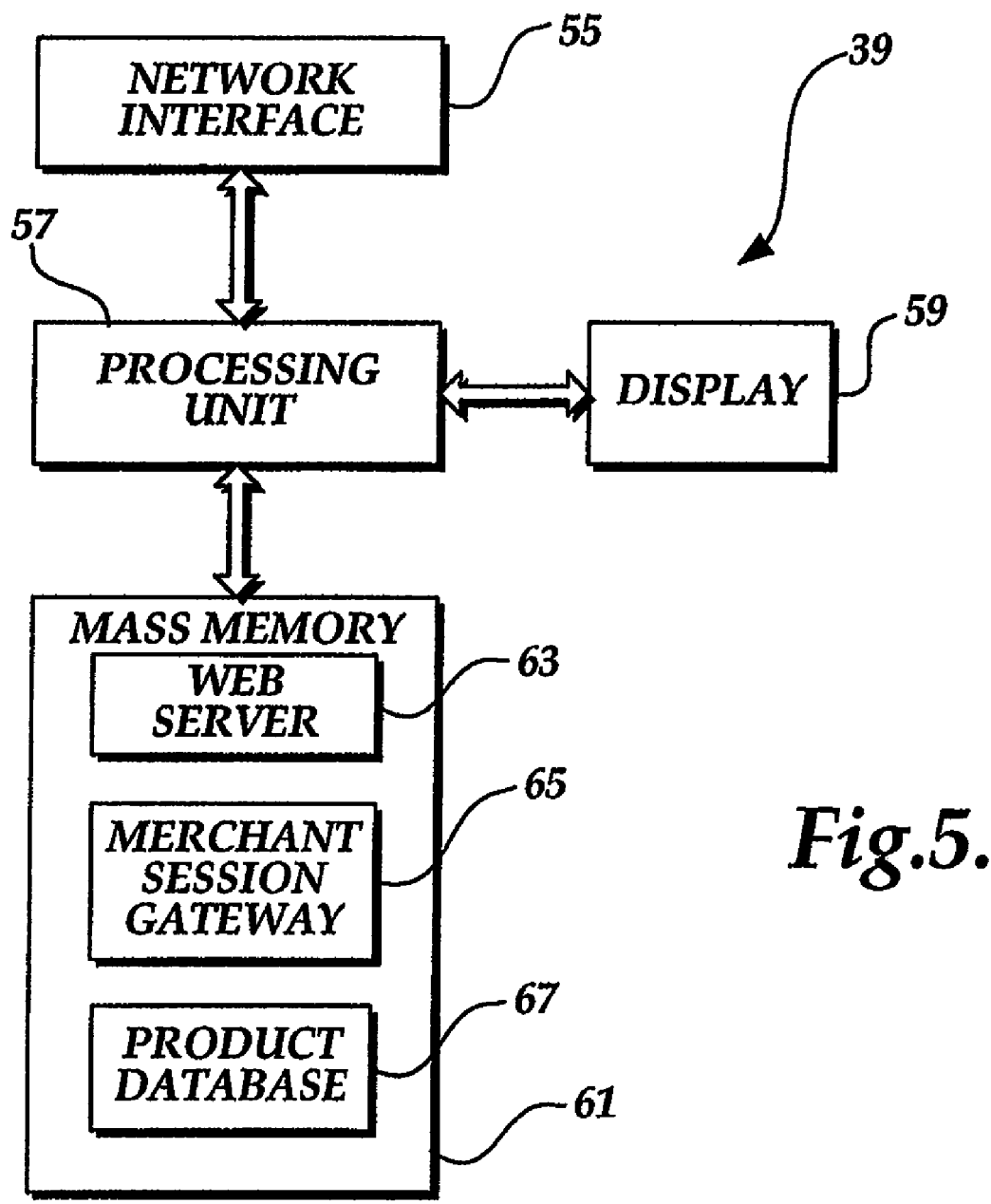
FIG. 5 is a block diagram of the several components of a merchant server shown in FIG. 2 that provides the ordered goods, services or content in accordance with the present invention.

As will also be described in more detail below, the products ordered by the consumer, and supplied by the billing server 34 may, in turn, be provided to the billing server by a merchant server 39 located elsewhere on the Internet 20. FIG. 5 depicts several of the key components of the merchant server 39. Those of ordinary skill in the art will appreciate that the merchant server 39 includes many more components than those shown in FIG. 5. However, it is not necessary that all of these generally conventional components be shown in order to disclose an illustrative embodiment of practicing the present invention. As shown in FIG. 5, the merchant server 39 includes a network interface 55 for connecting to a LAN 24 or WAN 26, or for connecting remotely to a LAN or WAN. Those of ordinary skill in the art will appreciate that the network interface 55 includes the necessary circuitry for such a connection, and is also constructed for use with the TCP/IP protocol, the particular network configuration of the LAN or WAN it is connecting to, and a particular type of coupling medium.

The merchant server 39 also includes a processing unit 57, a display 59, and a mass memory 61. The mass memory 61 generally comprises a random access memory (RAM), read-only memory (ROM), and a permanent mass storage device, such as a hard disk drive, tape drive, optical drive, floppy disk drive, or combination thereof. In one actual embodiment of the present invention, the mass memory contains a product database 67, which includes the electronically stored good or service ordered by the consumer. In other embodiments of the present invention, the product database 67 stores the premium content ordered by the consumer, i.e., the hypertext documents or other electronically stored information considered of monetary value by the merchant. In such embodiments, the mass memory 61 also stores the program code and data necessary for supplying the billing server with the URL for the premium content, as well as other access information for the premium content. More specifically, the mass memory 61 stores a merchant session gateway component 65 formed in accordance with the present invention for providing the billing server 34 with the access information that will be necessary for the computer 42 to access the desired premium content. It will be appreciated that the merchant session gateway component 65 and product database 67 may be stored on a computer-readable medium and loaded into mass memory 61 of the merchant server 39 using a drive mechanism associated with the computer-readable medium, such as a floppy or CD-ROM drive. Finally, mass memory 61 stores Web server software 66 for handling requests for stored information, including the premium content, received via the Internet and the WWW.

Ordering Goods and Services

Figure 6A:
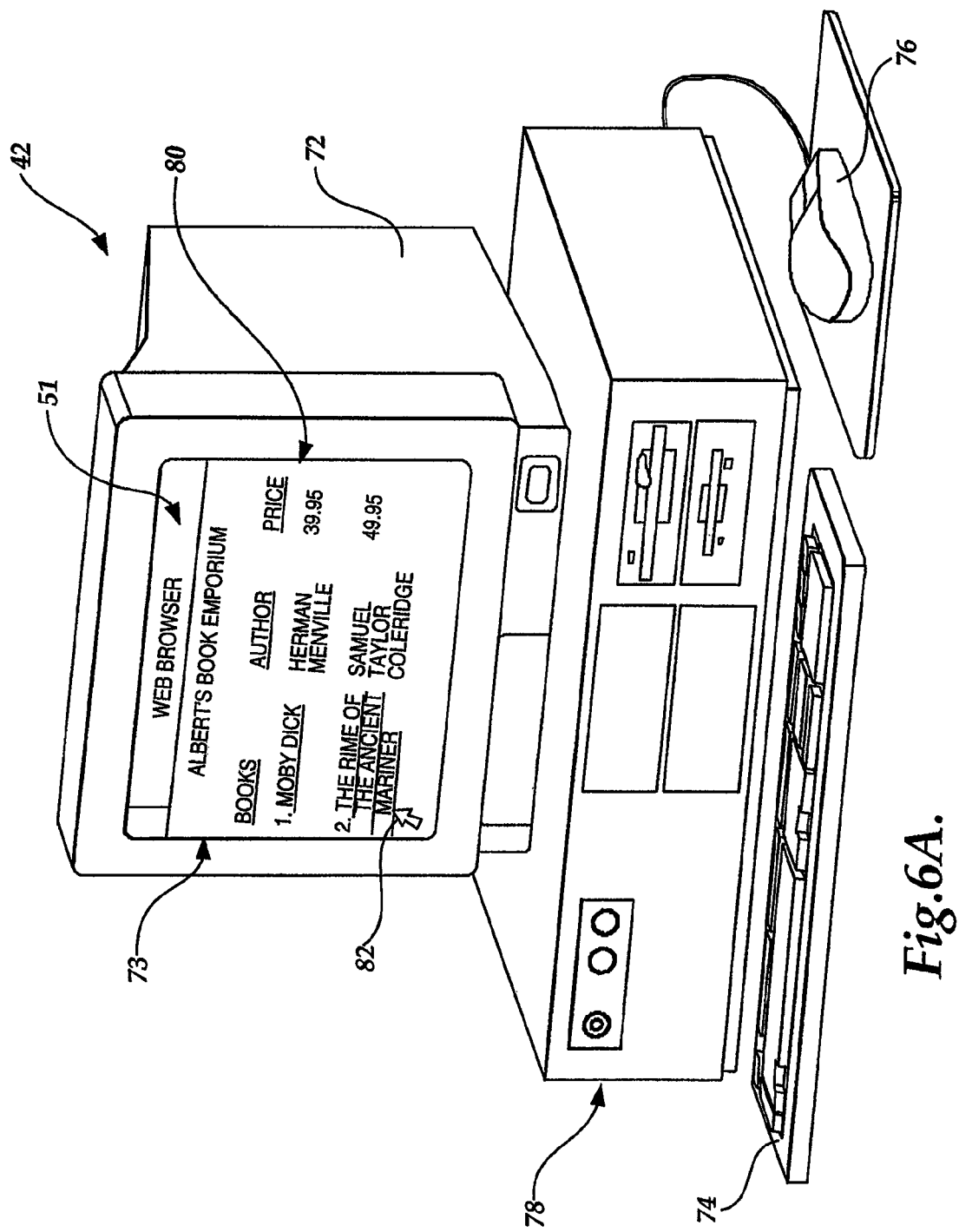
FIGS. 6A and 6B are windows produced by a Web browser installed on the consumer's computer from which the consumer orders a good and/or service.

Consumer computers, such as computer 42, are normally provided with a Web browser 51 such as Netscape's Navigator to provide the consumers with a graphical user interface to the Internet and the WWW. FIG. 6A illustrates the consumer's computer 42 that implements such a Web browser 51. The consumer's computer comprises a display or monitor 72, a keyboard 74, a mouse 76, and a main unit 78 that includes the components discussed above in connection with FIG. 3. Monitor 72 includes a screen 73 on which elements of the Web browser 51 are displayed. Such elements include a main window 80 for displaying hypertext documents requested by the consumer and a graphics cursor 82.

Figure 6B:
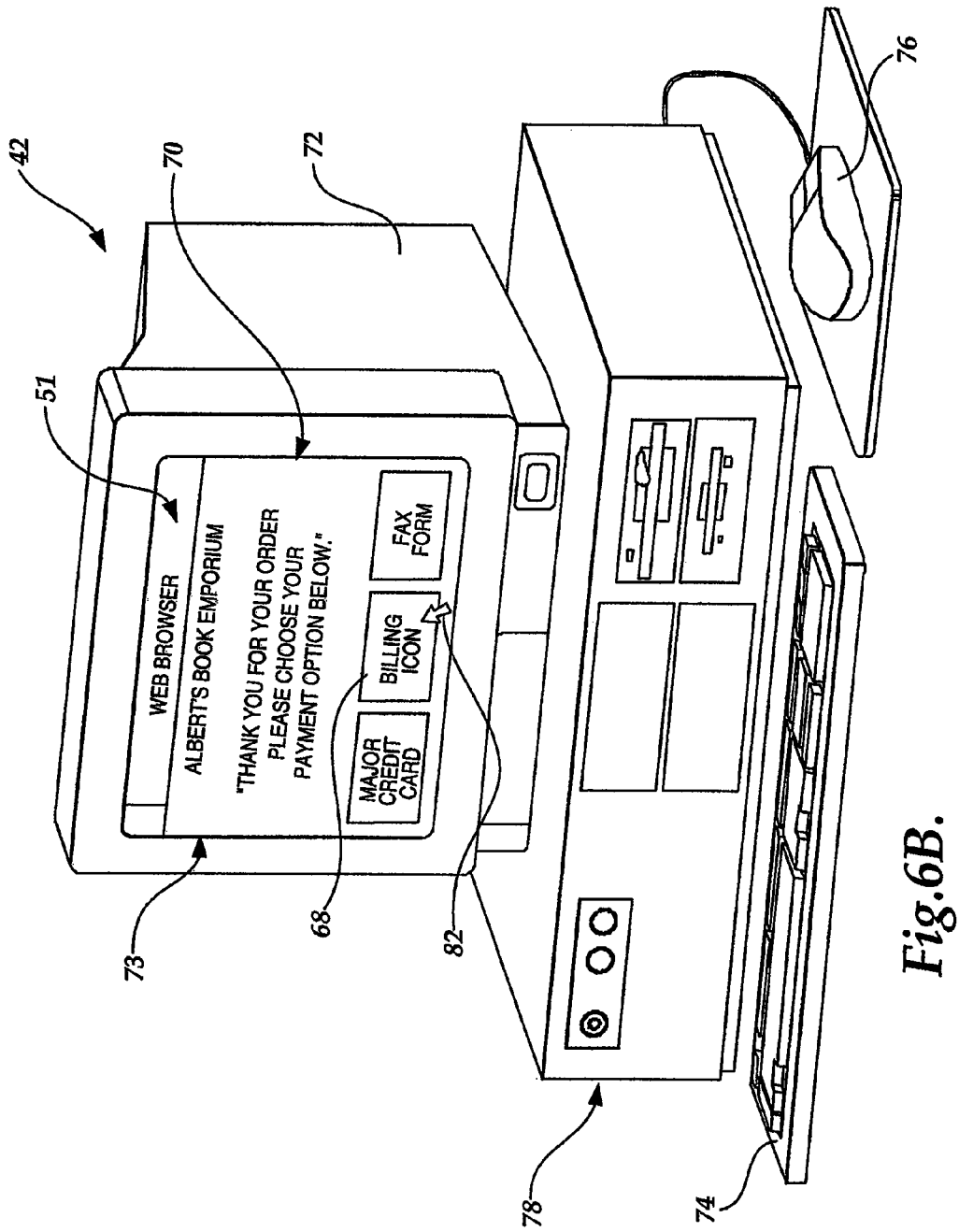

In accordance with a first embodiment for practicing the present invention, a consumer may visit a merchant's Web site using the Web browser 51 and retrieve a hypertext document from which the consumer may order goods and services. For example, a consumer using computer 42 and Web browser 51 may retrieve the hypertext document shown in the main window 80 of FIG. 6A from a book store Web site known hypothetically as "Albert's Book Emporium." The consumer makes a selection of a particular book by manipulating the graphics cursor 82 with the mouse 76 above the selection and "single-clicking." In response, an ordering window 70 is displayed on the screen 73 of the client's computer 42 as shown in FIG. 6B. The ordering window 70 displays to the consumer yet another hypertext document which includes various payment options, i.e., major credit cards with electronic transmission of credit information or facsimile transmission of credit information. However, in accordance with the present invention, an automatic billing icon 68 is also displayed as a payment option. As will be described in more detail below, if the consumer selects the automatic billing icon 68, the consumer will automatically be billed a one-time or "drop" charge for the ordered product on his or her next monthly telephone bill.

FIG. 7 illustrates the logic implemented by the Web browser 51 installed on the client's computer 42 when the automatic billing icon 68 is selected. The logic begins in a block 100 and proceeds to a block 102 where the Web browser 51 determines if the plug-in component 52 of the first embodiment of the present invention has been installed on the client's computer 42. If not, the client's computer downloads the plug-in 52 from the billing server 34 via the Internet 20 and installs the plug-in 52 in memory 50 in a block 104. If the plug-in 52 is already installed on the client's computer 42 or if it was not installed, but then loaded, the logic proceeds to a block 106 where the plug-in component 52 is initialized by the client's computer 42. The logic then ends in a block 108. Those of ordinary skill in the art will appreciate that the plug-in 52 of the present invention is downloaded, installed and initialized on the client's computer using methods well-known in the computer network arts.

Figure 8A:
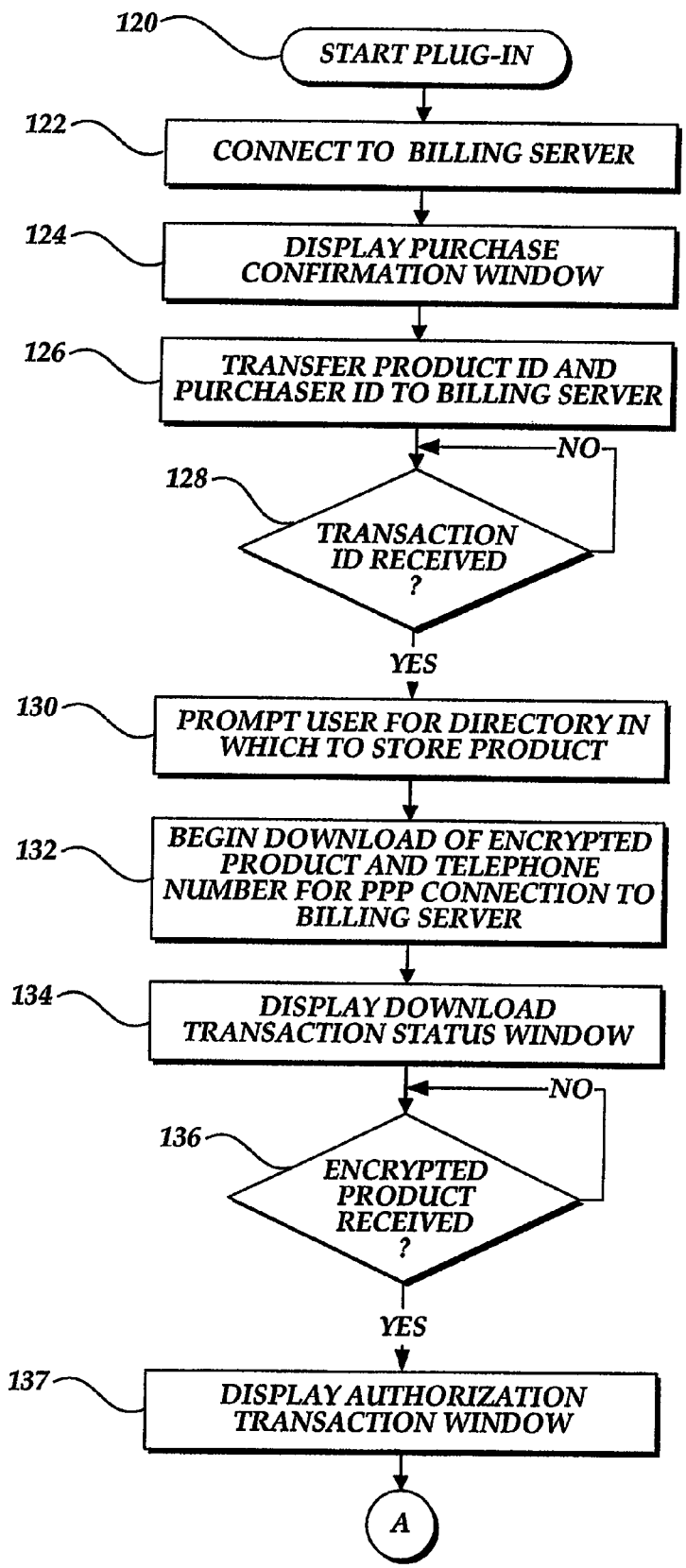
FIGS. 8A-8C are a flow chart illustrating the logic used by the consumer's computer to complete the order of a good and/or service over the Internet.
Figure 8B:
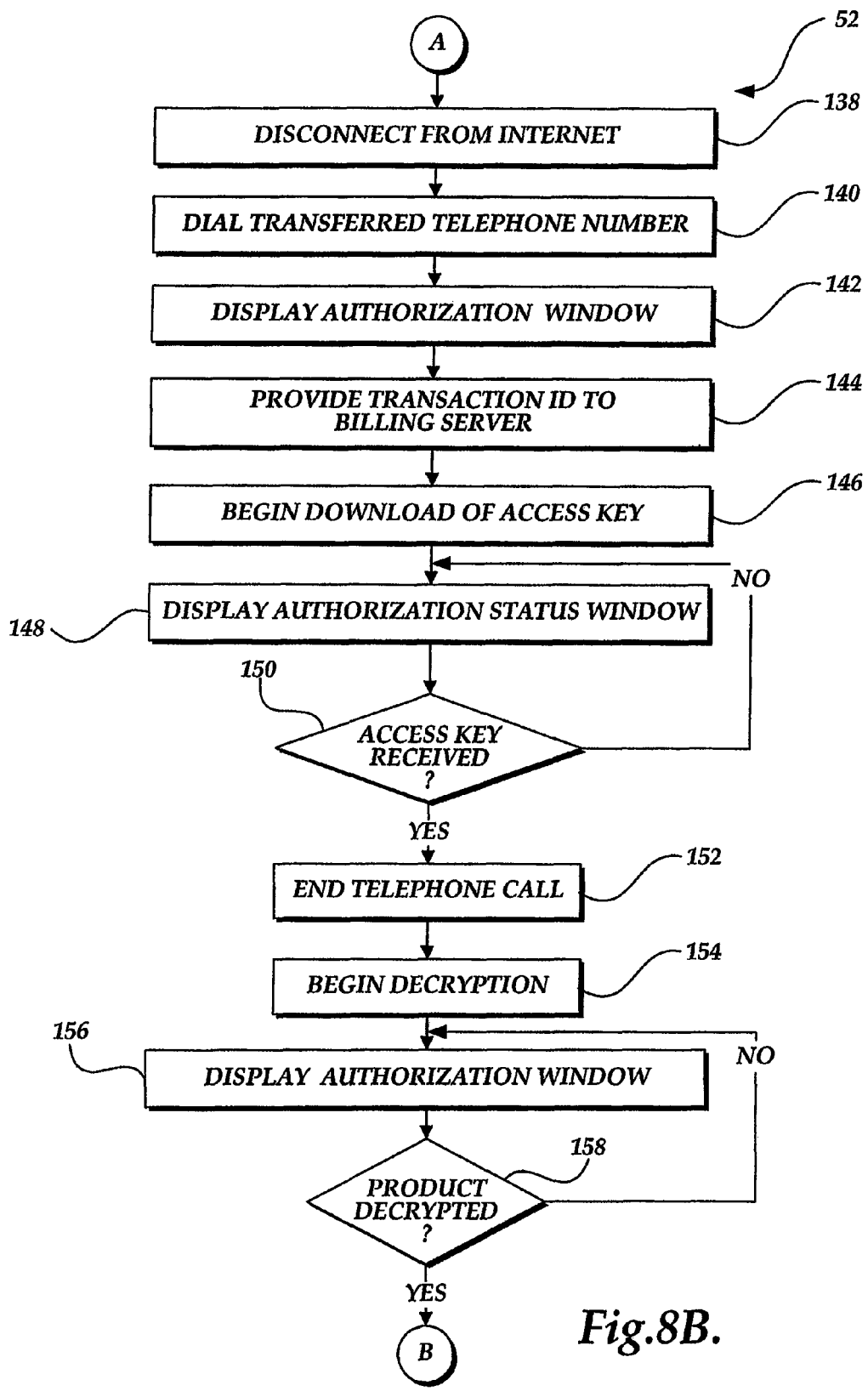
Figure 8C:
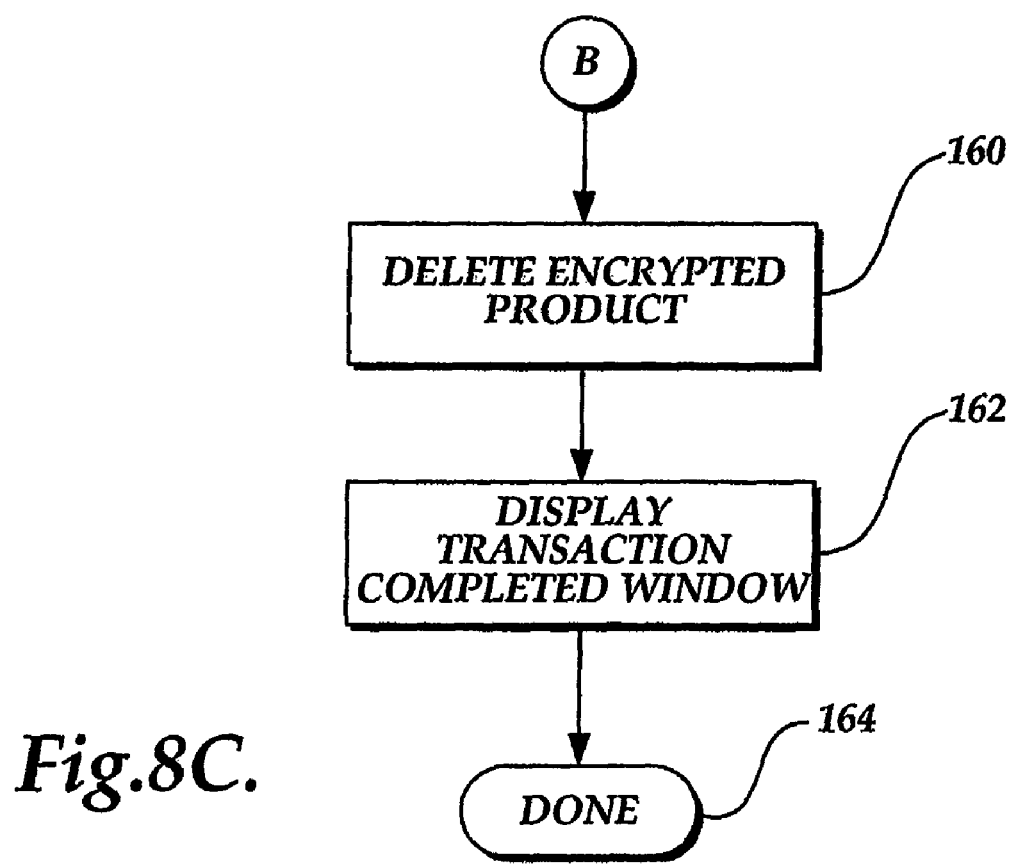
Figure 9A:
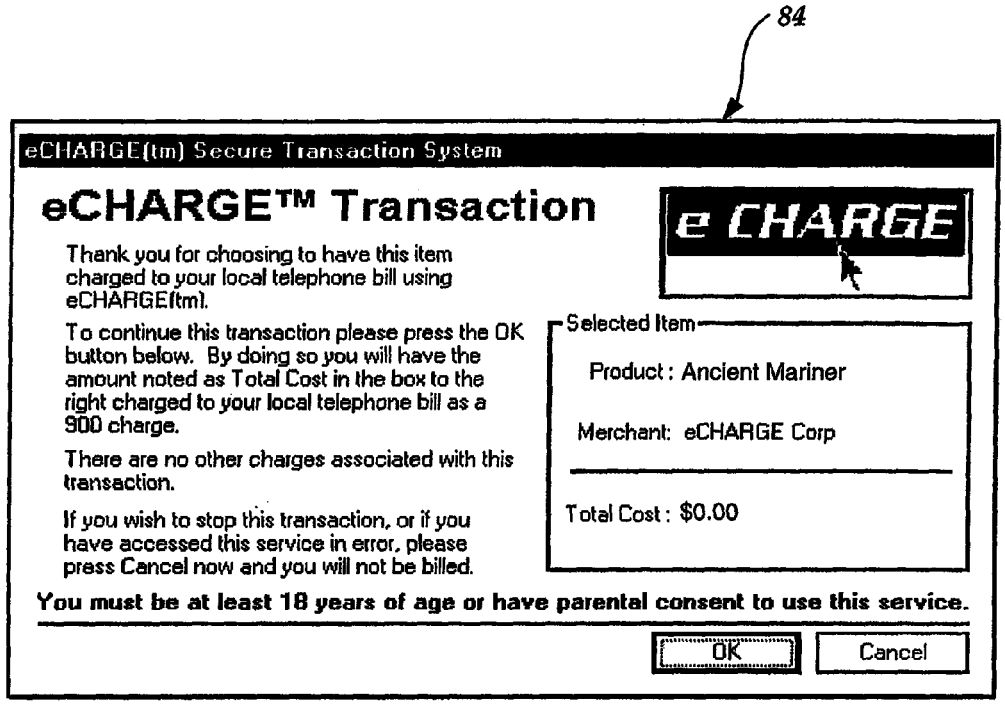
FIGS. 9A-9F are various windows produced by the consumer's computer for displaying messages associated with the order of a good and/or service.

Once the plug-in 52 is initialized, the plug-in 52 of the first embodiment of the present invention performs the logic depicted in FIGS. 8A-8C to place the consumer's order with the billing server 34. The logic begins in FIG. 8A in a block 120 and proceeds to a block 122 in which the client's computer 42 establishes an Internet connection to the billing server 34 using well-known methods in the art. Next, in a block 124, the plug-in 52 displays a purchase confirmation window 84 as shown in FIG. 9A on the screen 73 of the client's computer 42. The confirmation window 84 confirms the consumer's purchase and provides the consumer with the opportunity to cancel the purchase. If the consumer enters "OK" the logic will continue to a block 126 where the plug-in transfers to the billing server 34 via the Internet 20 a product I.D. uniquely identifying the product ordered to the billing server 34 and a purchaser I.D. assigned to the consumer. As will be described in more detail below, the consumer is assigned a purchaser I.D. the first time it places an order with the billing server 34. Hence, if this is the first time that the consumer has placed an order, the consumer will not have been assigned a purchaser I.D. and no such I.D. will be transferred in block 126.

Figure 9B:
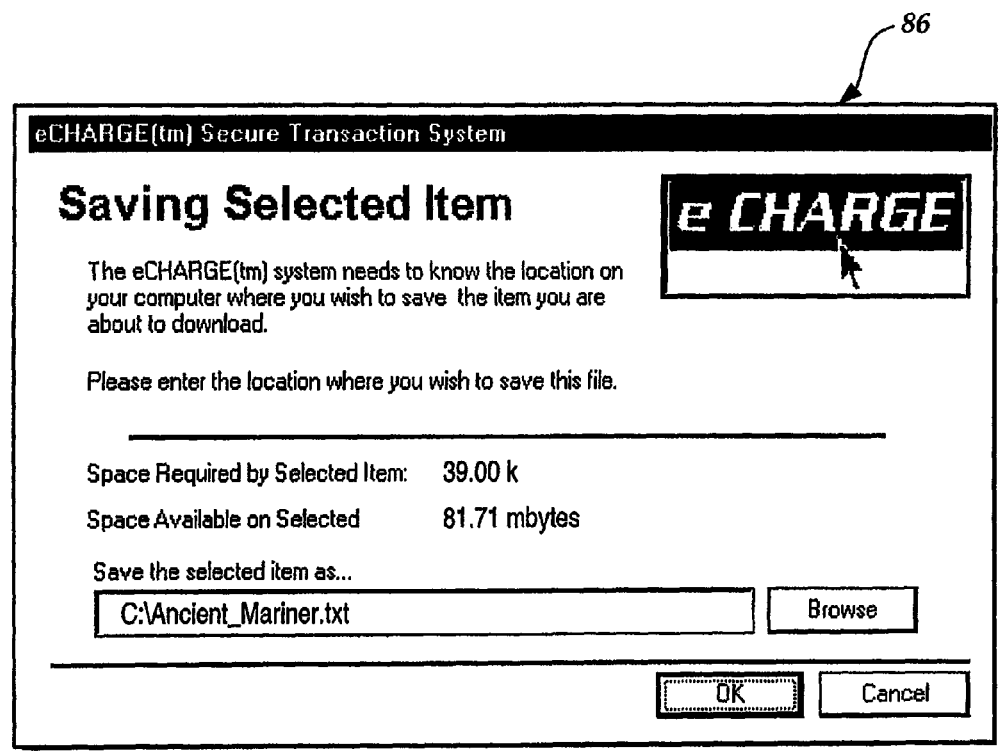

After transferring the purchaser I.D. and product I.D. to the billing server 34, the plug-in 52 waits for the billing server 34 to transfer to the consumer's computer 42 a transaction I.D., which identifies the consumer, the product ordered by the consumer (by product I.D.), and the billing server 34 supplying the order (as noted above, there may be more than one billing server located elsewhere on the Internet 20). As will be described in more detail below, the transaction I.D. will be used later to verify the consumer's order. If the transaction I.D. has not yet been received by the consumer's computer 42, the plug-in 52 merely repeats decision block 128 (i.e., essentially waits) until the transaction I.D. is received from the billing server 34. Once received, the plug-in 52 displays a directory prompt window 86 as shown in FIG. 9B which prompts the consumer for a network or local directory on the consumer's computer 42 in which to store the product that the consumer has purchased. After entering the directory in which the consumer wishes to save the product that it has purchased, the logic proceeds to a block 132 where the consumer's computer 42 begins receiving an encrypted version of the product transferred by the billing server 34. However, as will be discussed in more detail below, the consumer is not allowed to decrypt the product until the consumer has actually been billed for the product. In this regard, the billing server 34 also transfers, and the consumer's computer 42 also receives, a premium telephone number that the consumer's computer 42 uses to establish a PPP connection to the billing server 34 and obtain an access key for decrypting the product.

Figure 9C:
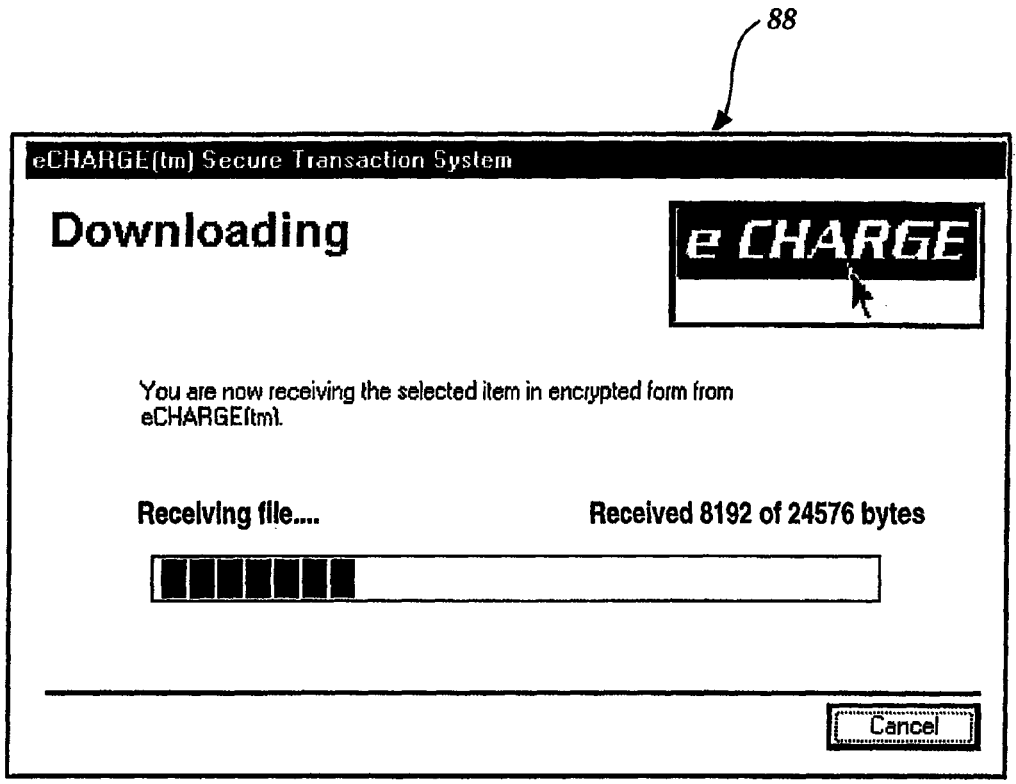

While the encrypted product is being downloaded via the Internet 20, the plug-in 52 displays a download transaction status window 88 as shown in FIG. 9C on the screen 73 of the consumer's computer 42, which indicates the changing status of the download to the consumer. Next, in a decision block 136, the plug-in 52 determines if the entire encrypted product has finally been received. If not, the logic repeats blocks 134 and 136 until the encrypted product has been completely downloaded to the consumer's computer 42.

Figure 9D:
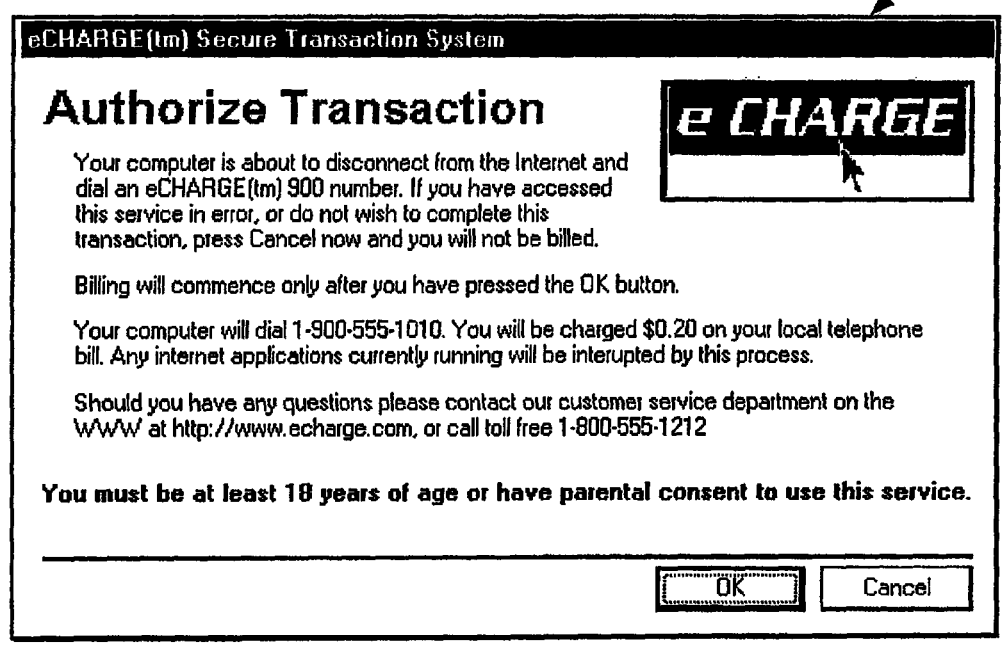

Once downloading of the encrypted product is complete, the plug-in 52 displays in a block 137 an authorization transaction window 89 as shown in FIG. 9D. Once the consumer depresses the OK button indicating authorization of the order, the plug-in 52 disconnects the consumer's computer 42 from the Internet 20 in a block 138 in FIG. 9B. Next, in a block 140, the plug-in 52 supplies the premium telephone number provided by the billing server 34 to the modem 49 of the computer 42, and the modem dials the number in order to establish a PPP connection to the billing server 34. In the actual embodiment of the present invention described herein, the premium telephone number provided by the billing server 34 and dialed by the modem 49 of the consumer's computer 42 is a "900 number," i.e., a ten digit number having with a 900 area code, assigned by the billing server's telephone service provider. As those of ordinary skill in the telephone switching arts will appreciate, the 900 area code has been generally reserved for commercial purposes, wherein the consumer is generally charged a flat rate or a particular rate per minute for a telephone call, and a portion of that charge is paid by the telephone service provider to the vendor or merchant to whom the 900 number is assigned. It will be recognized, however, that other types of telephone numbers may be used and, in fact, mandated by the telephone service provider without departing from the scope of the present invention.

Figure 9E:
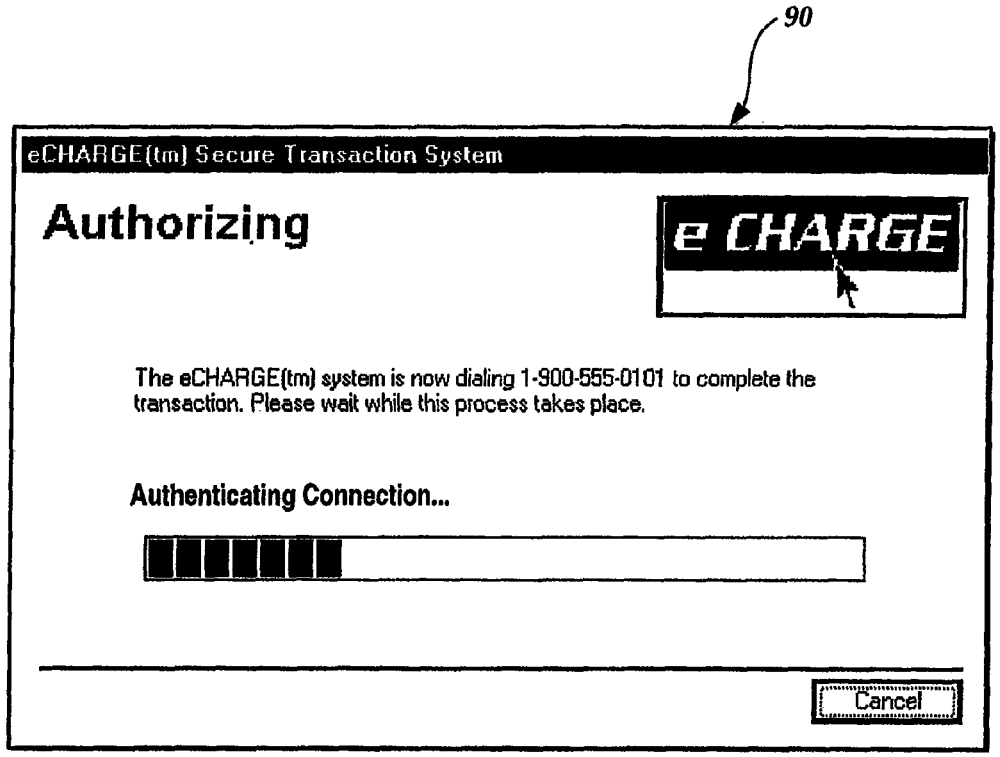

The telephone call placed by the modem 49 is answered by the telephone switch 40 connected to the CSTA monitor 36 of the LAN 24. The telephone switch 40 routes the telephone call to the access server 38, which notifies the billing server 34. Accordingly, the consumer's computer 42 establishes a PPP connection via the telephone switch 40 and access server 38 with the billing server 34. While this connection is being established, the plug-in 52 displays an authorization window 90 as shown in FIG. 9E on the screen 73 of the consumer's computer 42, which indicates the changing status of the connection to the billing server 34 in a block 142.

Once the PPP connection between the consumer's computer 42 and the billing server 34 is fully established, the plug-in 52 transfers the previously assigned transaction I.D. to the billing server 34 so that the billing server 34 may verify the order in a block 144. It will be recognized that many consumers may be placing orders simultaneously, and, hence, many computers located elsewhere on the Internet 20 may be establishing PPP connections with the billing server 34 at any given time. Therefore, the transaction I.D. is necessary so that the billing server 34 may identify the consumer and the order placed by the consumer and supply the plug-in 52 installed on the consumer's computer 42 with the appropriate access key for decrypting the previously sent product. In other words, the transaction I.D. serves a type of claim ticket used by the consumer to claim the correct access key once billing is complete.

Next, in a block 146, the plug-in 52 begins downloading the appropriate access key for the decrypting the product. As will be described in more detail below, as long as the billing server 34 receives the transaction I.D. from the plug-in 52 within a certain time period (i.e., the free period at the beginning of a 900 telephone call during which the caller can hang-up without being charged), the billing server 34 will transfer the appropriate access key for decrypting the encrypted product. Otherwise, the PPP connection between the consumer's computer 42 and the billing server 34 is terminated and the consumer is not billed for the telephone call or the product.

While waiting for the access key, the plug-in 52 displays another authorization window 90 in a block 148 which notifies the consumer of the status of the download of the access key. In a decision block 150, the logic determines if the consumer's computer 42 has finally received the access key. If not, blocks 148 and 150 are merely repeated until the access key is received. Once received, the plug-in 52 ends the telephone call and, hence, terminates its PPP connection with the billing server 34 in a block 152.

Figure 9F:
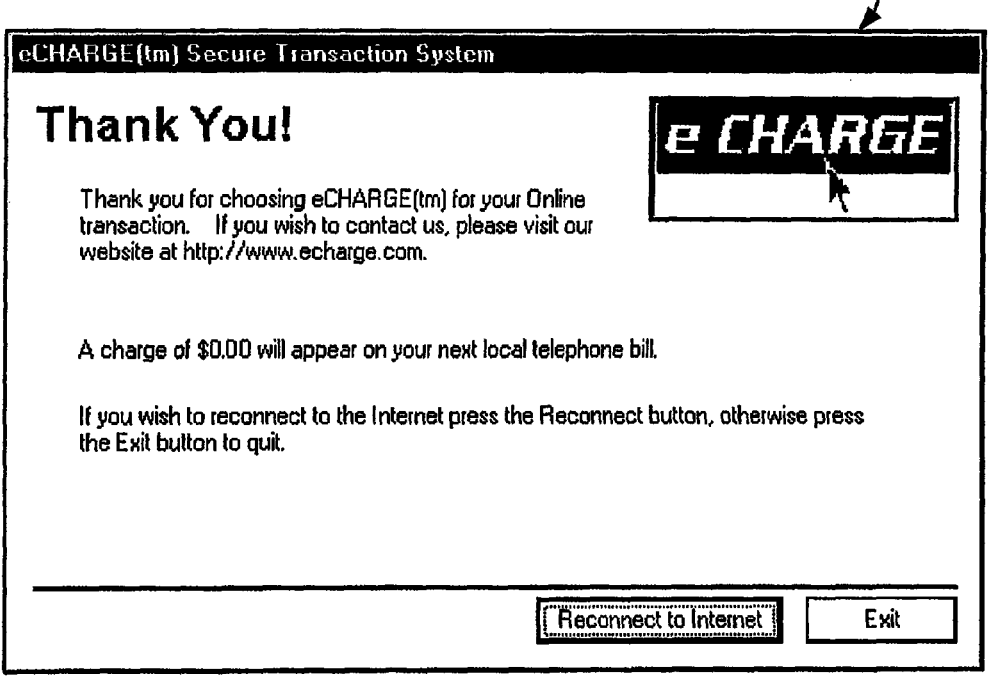

After terminating the PPP connection with the billing server 34, the plug-in 52 begins decryption of the encrypted product using the access key in a block 154. In a block 156, the plug-in 52 displays another authorization window 90 notifying the consumer that decryption of the product is in progress in a block 156. Accordingly, in a decision block 158 the plug-in determines if the product has been fully decrypted. If not, blocks 156 and 158 are merely repeated until the product has been fully decrypted. Once fully decrypted, the logic proceeds to a block 160 shown in FIG. 8C where the plug-in 52 deletes the encrypted product from memory 50 of the client's computer in an effort to save space. Next, in a block 162, the plug-in 52 depicts a transaction completed window 91 on the screen 73 of the consumer's computer 42 as shown in FIG. 9F. The consumer is then provided the option in the transaction completed window 91 to reconnect to the Internet via its normal Internet service provider. The logic for the plug-in 52 then ends in a block 164.

Figure 10:
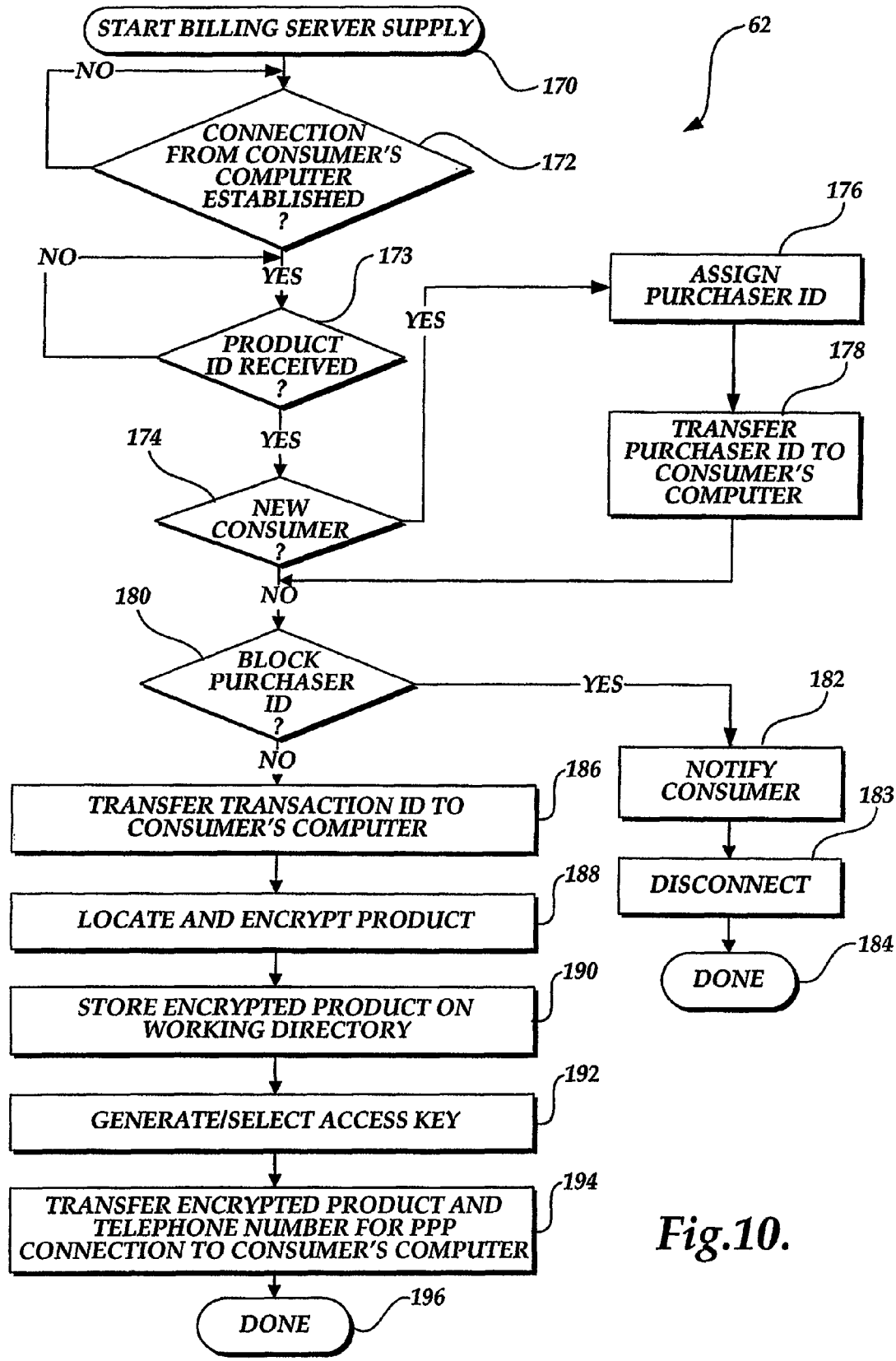
FIG. 10 is a flow chart illustrating the logic used by the billing server connected to the LAN shown in FIG. 2 to supply the ordered good and/or service to the consumer's computer.

Now that the logic implemented by the plug-in component 52 has been discussed, it is necessary to describe the billing server component 62 implemented by the billing server 34 in a first embodiment of the present invention to supply the encrypted product and access key to the consumer's computer 42. As shown in FIG. 10, the logic implemented by the billing server component 62 to supply the encrypted product begins in a block 170 and proceeds to a decision block 172 where it determines whether the connection between the consumer's computer 42 and the billing server 34 has been established via the Internet 20. If not, decision block 172 is merely repeated until such a connection has been established. Next, in a decision block 173, the billing server component determines if the product I.D. has been received from the consumer's computer 42. If not, decision block 173 is repeated until the product I.D. has been received.

Once the product I.D. has been received, the billing server component 62 determines if the consumer is new in a decision block 174, i.e., if this is the first time this consumer has placed an order. If this is the first time the consumer has placed an order, then the plug-in 52 will be unable to provide the billing server 34 with a purchaser I.D. for the consumer. Accordingly, the billing server component 62 assigns the consumer a purchaser I.D. in a block 176 and transfers the purchaser I.D. to the consumer's computer 42 in a block 178. As noted above, the plug-in 52 will return this purchaser I.D. each subsequent time the consumer places an order. The purchaser I.D. is logged in the product and information database 64 of the billing server and is used for accounting and recordkeeping purposes, such as payment histories, customer demographics, etc.

If the consumer is not a first-time buyer or is a first-time buyer and, thus, has been assigned a purchaser I.D., the logic proceeds to a decision block 180 where the billing server component 62 determines whether an order by this particular consumer should be denied. More specifically, the billing server 34 determines whether the purchaser I.D. is blocked. It will be appreciated that over the course of time, certain consumers may fail to pay their telephone bills, which include the charges for the orders placed using the present invention. A log of such purchaser I.D.s will be maintained in the database of product and logged information 64 in mass memory 60 of the billing server 34. If the purchaser I.D. of the consumer placing the order matches one of the logged purchaser I.D.s, the consumer will be prevented from placing its order and notified appropriately in a block 182. Such notification may include a message displayed on the screen 73 of the consumer's computer 42 followed by termination of the PPP connection between the billing server 34 and the consumer's computer 42 in a block 183. The logic then ends in a block 184. On the other hand, if the consumer is not blocked by purchaser I.D. in decision block 180, the logic proceeds to a block 186 where the billing server 34 assigns a transaction I.D. to the order and transfers the transaction I.D. to the consumer's computer 42. The transaction I.D. identifies the consumer, the product ordered (by product I.D.) and the billing server 34. As noted above, the plug-in 52 installed on the consumer's computer 42 waits for this transaction I.D. before prompting the consumer for a directory in which to store the product it has ordered.

After transferring the transaction I.D. to the consumer's computer 42, the billing server component 62 locates the product ordered by the consumer and encrypts it in a block 188. It will be appreciated by those of ordinary skill in the art that the product may be stored in the database 64 of product information located in mass memory 60 of the billing server 34, or it may be located on a merchant server 39 located elsewhere in the Internet. If the product is located elsewhere, the billing server 34 will establish an Internet connection with the corresponding merchant server 39 and download the ordered product. It will also be appreciated that the product, whether located in mass memory 60 of the billing server 34 or elsewhere on the Internet 20, may be pre-encrypted. Therefore, it may not be necessary for the billing server component 62 to encrypt the product itself.

Next, in a block 190, the billing server component 62 stores the encrypted product in a working directory in mass memory 60 of the billing server 34 as a precursor to transferring it to the client's computer 42. In a block 192, the billing server component 62 selects an access key, i.e., password, for decrypting the encrypted product stored in the working directory. It will be appreciated that the billing server component 62 may select the access key from a predefined list stored in the database 64 of product and logged information, or the billing server component 62 may generate an access key at random or using various other selection algorithms. Once the access key has been selected by the billing server component 62, the billing server 34 transfers the encrypted product to the consumer's computer 42 as well as the telephone number that the plug-in 52 will use to establish a PPP connection with the billing server 34 so that billing can be performed and the access key may be provided to the plug-in 52. The logic then ends in a block 196.

Figure 11:
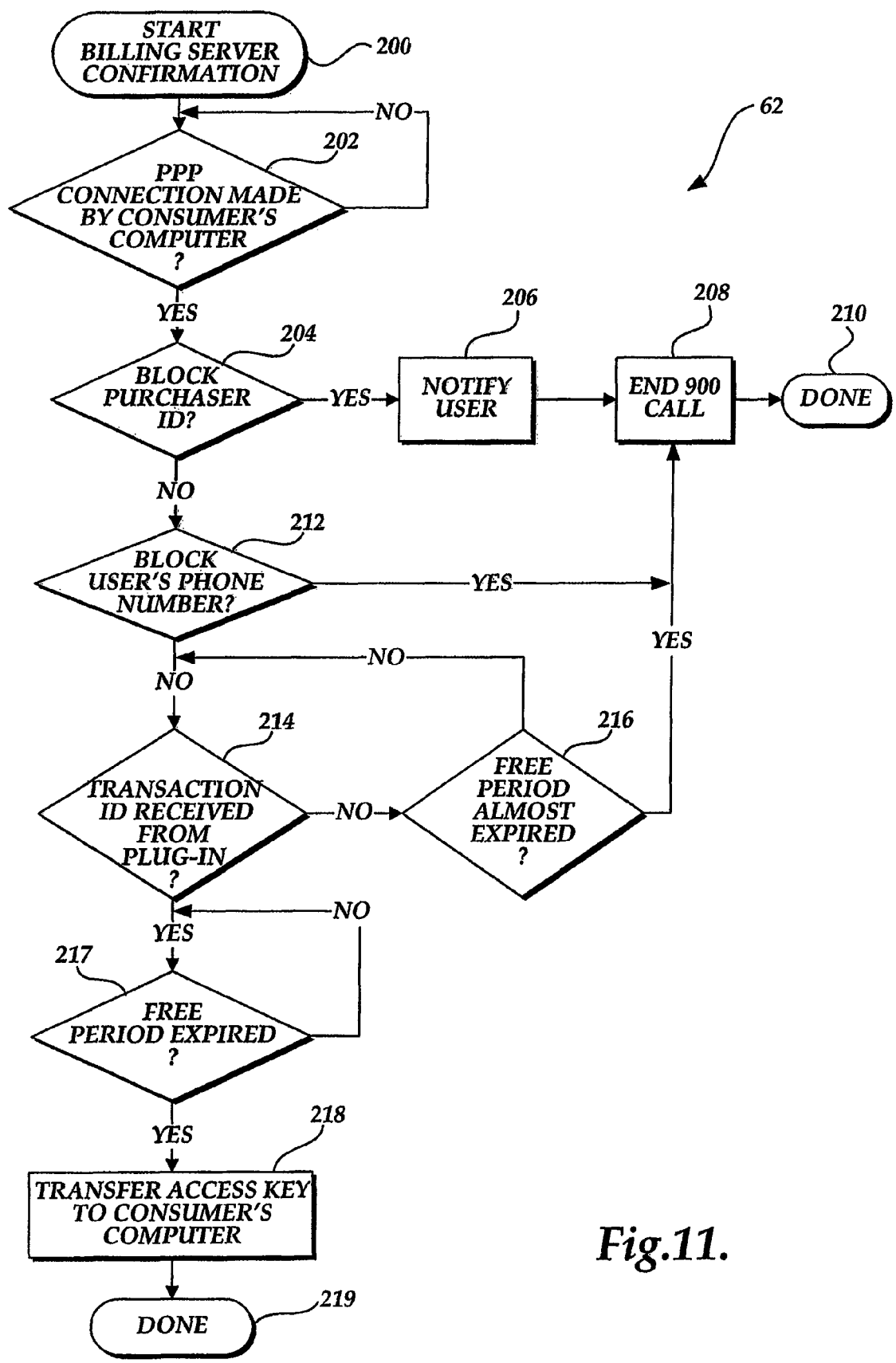
FIG. 11 is a flow chart illustrating the logic used by the billing server connected to the LAN shown in FIG. 2 to confirm the order of the good and/or service.

The logic employed in the first embodiment of the present invention by the billing server component 62 to confirm completion of billing for a placed order and, thus, supply the plug-in 52 with the access key is depicted in FIG. 11. The logic begins in FIG. 11 in a block 200 and proceeds to a decision block 202 where the billing server component 62 determines if a PPP connection has been established to the billing server 34 by any consumer computer 42 installed with a plug-in 52. As noted above, many consumers may be placing orders at any given time, and, hence, many computers may be attempting to establish a PPP connection to the billing server 34 so that they may obtain the appropriate access key for decrypting their ordered product. Hence, decision block 202 is repeated until such a connection has been established.

Once a PPP connection has been established, the logic proceeds to a decision block 204 where the billing server component 62 determines whether or not the order placed by the consumer should be denied by determining whether the purchaser I.D. assigned to the consumer and transferred to the billing server 34 by the plug-in 52 is blocked. If so, the consumer is appropriately notified, e.g., by a message displayed on the screen 73 of the consumer's computer 42, in a block 206. Accordingly, the billing server component 62 ends the premium telephone call and terminates the PPP connection with the consumer's computer 42. It will be appreciated from the discussion below that if the premium telephone call is ended at this time, i.e., before the expiration of the free period, the consumer will not be billed for the order placed. The logic then ends in a block 210.

If the order is not denied based on purchaser I.D., the logic proceeds to a decision block 212 where it determines if the order should be denied based on the consumer's telephone number (i.e., the telephone number from which the modem 49 of the consumer's computer is making the premium telephone call to the billing server 34) in a decision block 212. In one actual embodiment of the present invention, a list of telephone numbers is maintained by the CSTA monitor 36 of all consumers who have not paid their monthly telephone bills for ordered products or who have indicated that all purchases attempted from their telephone number should be denied. If the order is to be denied based on the consumer's telephone number, the CSTA monitor 36 automatically provides a busy signal to the modem 49 of the consumer's computer 42 in a block 206. Next, in a block 208, the telephone call made by the modem 49 of the consumer's computer, and hence the PPP connection to the billing server 34 is terminated. The logic then ends in a block 210.

Returning to decision block 212, if the order is permitted, the logic proceeds to a decision block 214 in which the billing server component 62 determines if it has received the transaction I.D. from the plug-in 52. If not, the logic proceeds to another decision block 216 in which the billing server component 62 determines if the free period has almost expired. As noted above and described in more detail below, this free period is the time interval at the beginning of a 900 telephone call during which the consumer can hang up and not be charged for the telephone service by the telephone service provider. By default, the free period is normally 18.9 seconds. However, the free period is dictated by the telephone service provider, and hence, may vary accordingly. During the free period, the plug-in 52 may display a message, which informs the consumer that they may hang up and not be charged for the telephone call or the product. If the transaction I.D. is not received from the plug-in 52 during the free period, the billing server component 62 will automatically terminate the premium telephone call in a block 208, so that the consumer is not erroneously charged for the premium telephone call. Consequently, the logic ends in a block 210.

If the transaction I.D. is received, with time to spare, the logic proceeds from decision block 214 to a decision block 217 where the billing server component 62 determines if the free period has expired. In other words, once the billing server 34 has received the transaction I.D. from the plug-in 52, the billing server component 62 merely waits for the free period to expire. Once expired, the telephone service provider bills the consumer for the ordered product as will be discussed in more detail below and the billing server component 62 transfers the access key assigned to the order identified by the transaction I.D. to the consumer's computer 42 so that the plug-in 52 can decrypt the product previously provided by the billing server component 62. The logic then ends in a block 219.

Figure 12:
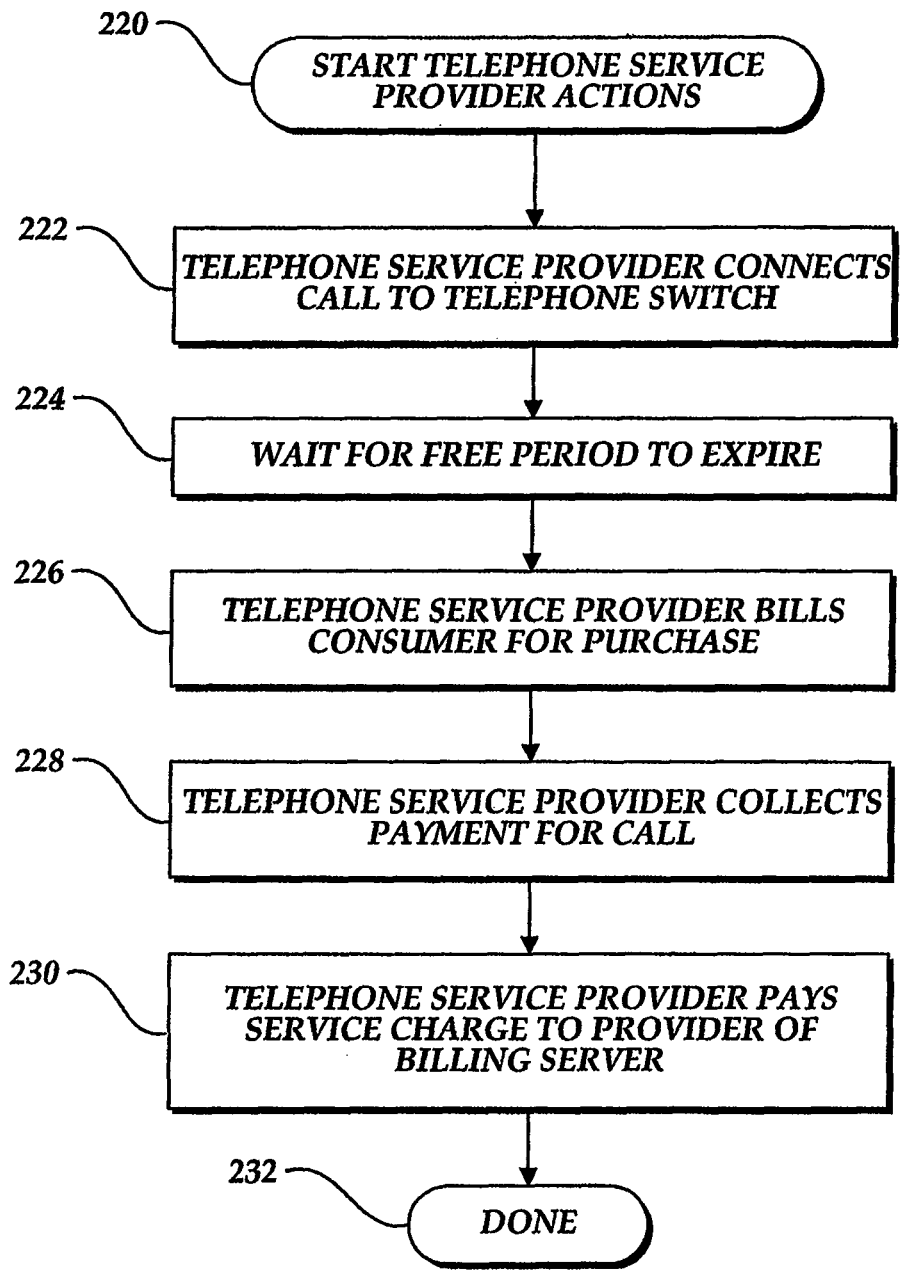
FIG. 12 is a flow chart illustrating the actions taken by a telephone service provider to automatically bill the consumer for the ordered good and/or service.

Now that the plug-in and billing server components of the present invention have been described, the actions provided by the telephone service provider in order to automatically bill the consumer for the ordered product are discussed in more detail in connection with FIG. 12. The flow diagram begins in a block 220 and proceeds to a block 222 where the telephone service provider routes the premium telephone call made by the modem 49 of the consumer's computer 42 to the telephone switch 40 connected to the CSTA monitor 36 of the LAN 24. Once the telephone switch 40 answers the call, the telephone service provider waits for the free period described above to expire in a block 224 before it bills the consumer for the order in a block 226. In the meantime, either the consumer's computer 42 or the billing server 34 may terminate the telephone call and prevent billing for the order. Once the free period has expired, however, the telephone service provider bills the consumer for the ordered product as a unit charge or "drop charge" using its own internal accounting and billing procedures. Consequently, the charge for the product and the premium telephone call will appear on the consumer's next monthly telephone bill for the telephone number from which the modem 49 of the consumer's computer 42 made the telephone call to the billing server 34. In a block 228, the telephone service provider collects payment for the premium telephone call and the ordered product from the consumer via its normal collection processes. Once the telephone service provider has collected payment for the call, the telephone service provider pays a service charge to the provider of the billing server 34 in a block 230. This service charge can be a flat rate or can be a percentage of each order placed.

Figure 13:
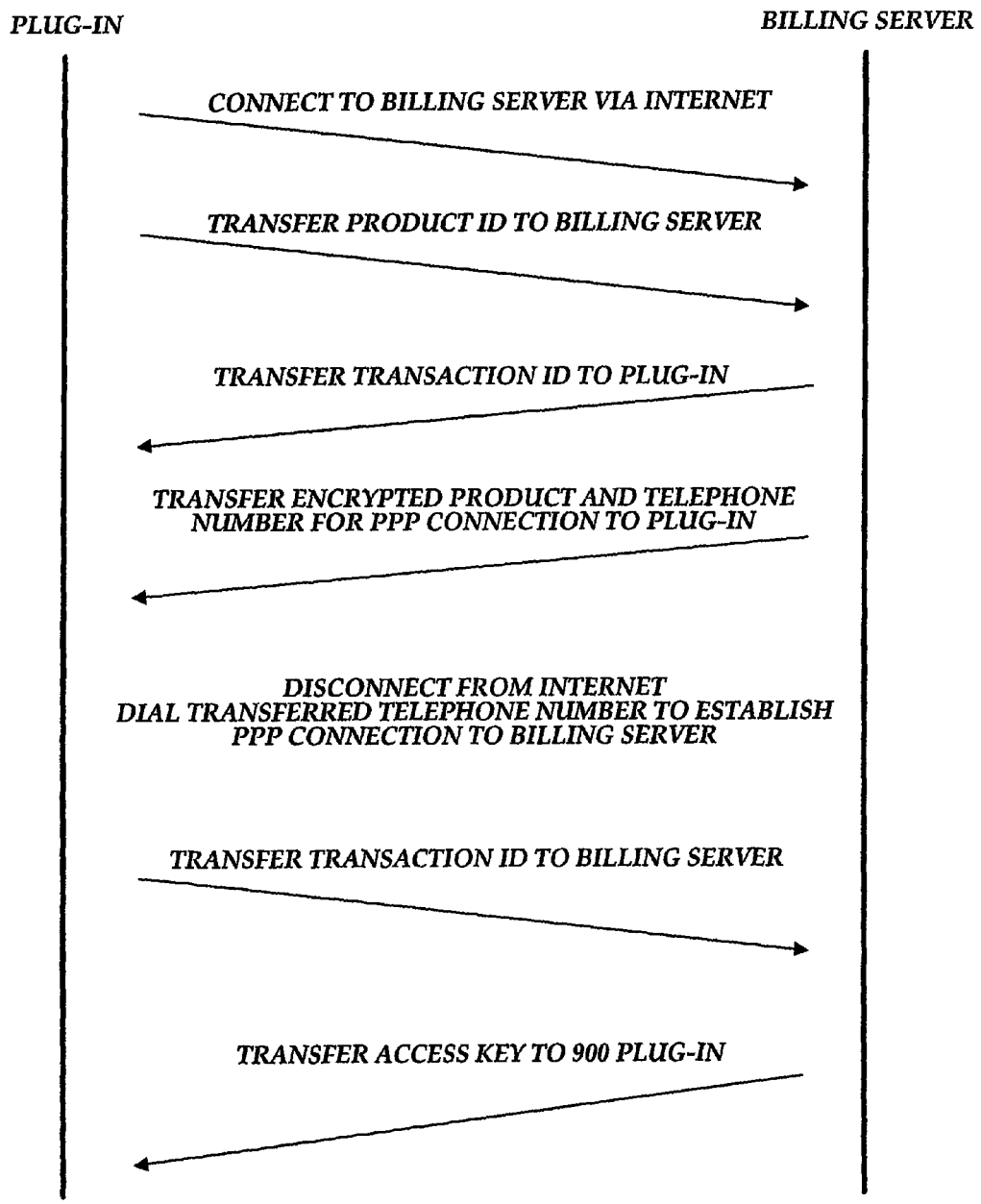
FIG. 13 is a diagram illustrating the actions taken in parallel by the consumer's computer and the billing server to order and supply the good and/or service.

FIG. 13 is an overall diagram depicting the actions of the plug-in 52/consumer's computer 42 and the billing server component 62/billing server 34 in parallel. Consequently, FIG. 13 depicts the consumer's computer 42 establishing an Internet connection to the billing server 34. The consumer's computer 42 then transfers the product I.D. of the ordered product to the billing server 34. In response, the billing server 34 transfers a transaction I.D. for the order to the consumer's computer 42. The billing server 34 also transfers the encrypted product and a telephone number for establishing a PPP connection to the billing server 34 to the consumer's computer 42. Once the consumer's computer 42 has received the transaction I.D. and the encrypted product, the consumer's computer 42 disconnects from the Internet 20 and dials the telephone number transferred by the billing server 34 in order to obtain the access key for decrypting the product. Once the PPP connection with the billing server 34 is established, the consumer's computer 42 transfers the transaction I.D. back to the billing server 34 so that the billing server component 64 may identify the order and match the transaction I.D. to the access key assigned to that transaction. Accordingly, the billing server transfers the appropriate access key to the consumer's computer so that the plug-in 52 may decrypt the product. It is readily apparent from FIG. 13 that the plug-in 52 is only able to decrypt the ordered product and thus, the consumer is only able to use the product, once the access key has been provided, which necessarily requires that the consumer's computer make a premium telephone call that is billed by the telephone service provider to the consumer's telephone service account.

Ordering Premium Content

In a second embodiment of the present invention, a consumer may order premium content provided by a merchant over the Internet 20 and be automatically billed for the amount of time the consumer spends accessing the content, rather than billed a unit rate or drop-charge for the premium content.

Figure 14:
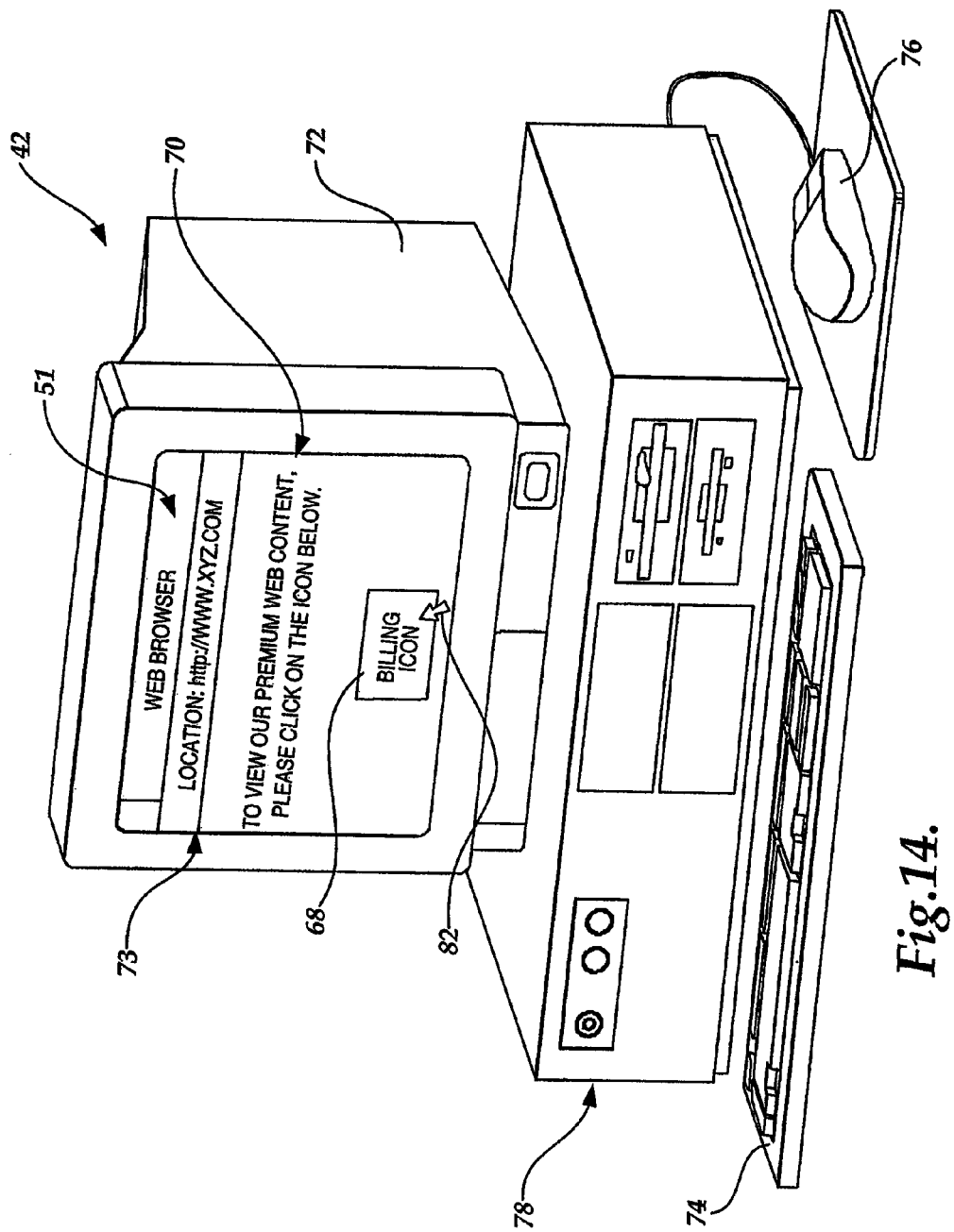
FIG. 14 illustrates a window produced by a Web browser installed on the consumer's computer from which the consumer orders premium content in accordance with an alternative embodiment of the present invention.

As shown in FIG. 14, a consumer may use a computer 42 installed with a Web browser 51 to visit a merchant's Web site and retrieve a hypertext document which may contain or be linked to content considered to have a monetary value to the merchant. For example, a consumer using computer 42 and Web browser 51 may retrieve the hypertext document shown in a main window 70 of FIG. 14 from a merchant server 39. The consumer may order the premium content stored at that merchant's Web site, i.e., at merchant server 39, by selecting the automatic billing icon 68. As will be described in more detail below, if the consumer selects the automatic billing icon 68, the consumer will be billed automatically by its telephone service provider on his or her next monthly telephone bill for the time spent on a premium telephone line accessing the premium content retrieved from the merchant server 39.

The logic implemented by the Web browser 51 installed on the client's computer 42 when the automatic billing icon 68 is selected is the same in the second embodiment of the present invention as the first, which was described above in connection with FIG. 6. Briefly, in response to selection of the automatic billing icon 68, the Web browser 51 downloads a plug-in component 52' from the billing server 34 via the Internet 20 and installs the plug-in component 52' in memory 50 of the consumer's computer 42 if the plug-in component 52' has not already been installed on the consumer's computer 42. It will be appreciated, however, that the logic implemented by the plug-in component 52' in the second embodiment of the present invention is slightly different than that described above in connection with the first embodiment. Hence, the reference number (52) for the plug-in component in the second embodiment is denoted with a prime "'".

Figure 15A:
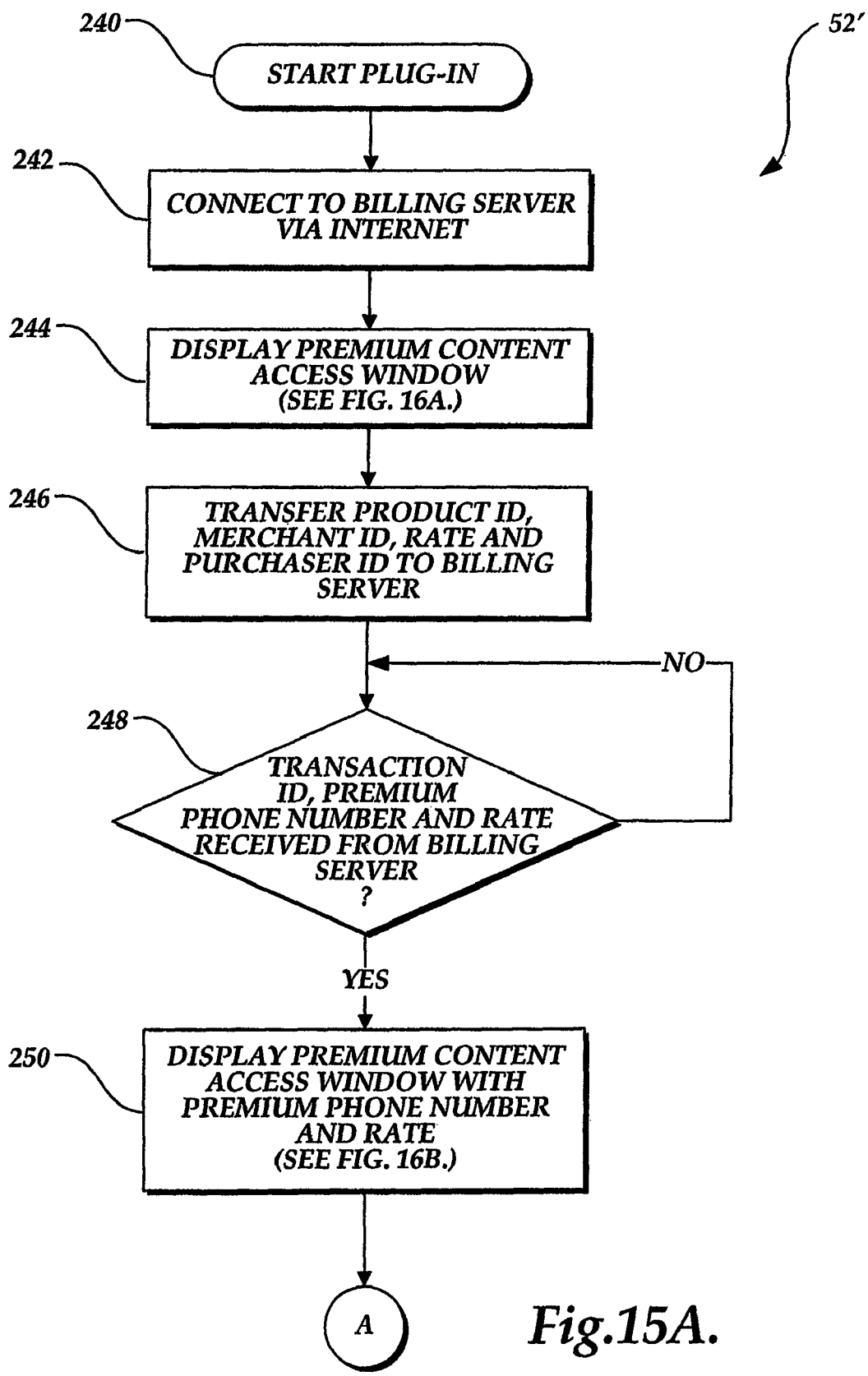
FIGS. 15A-15C are a flow chart illustrating the logic used by the consumer's computer to order premium content over the Internet.
Figure 15B:
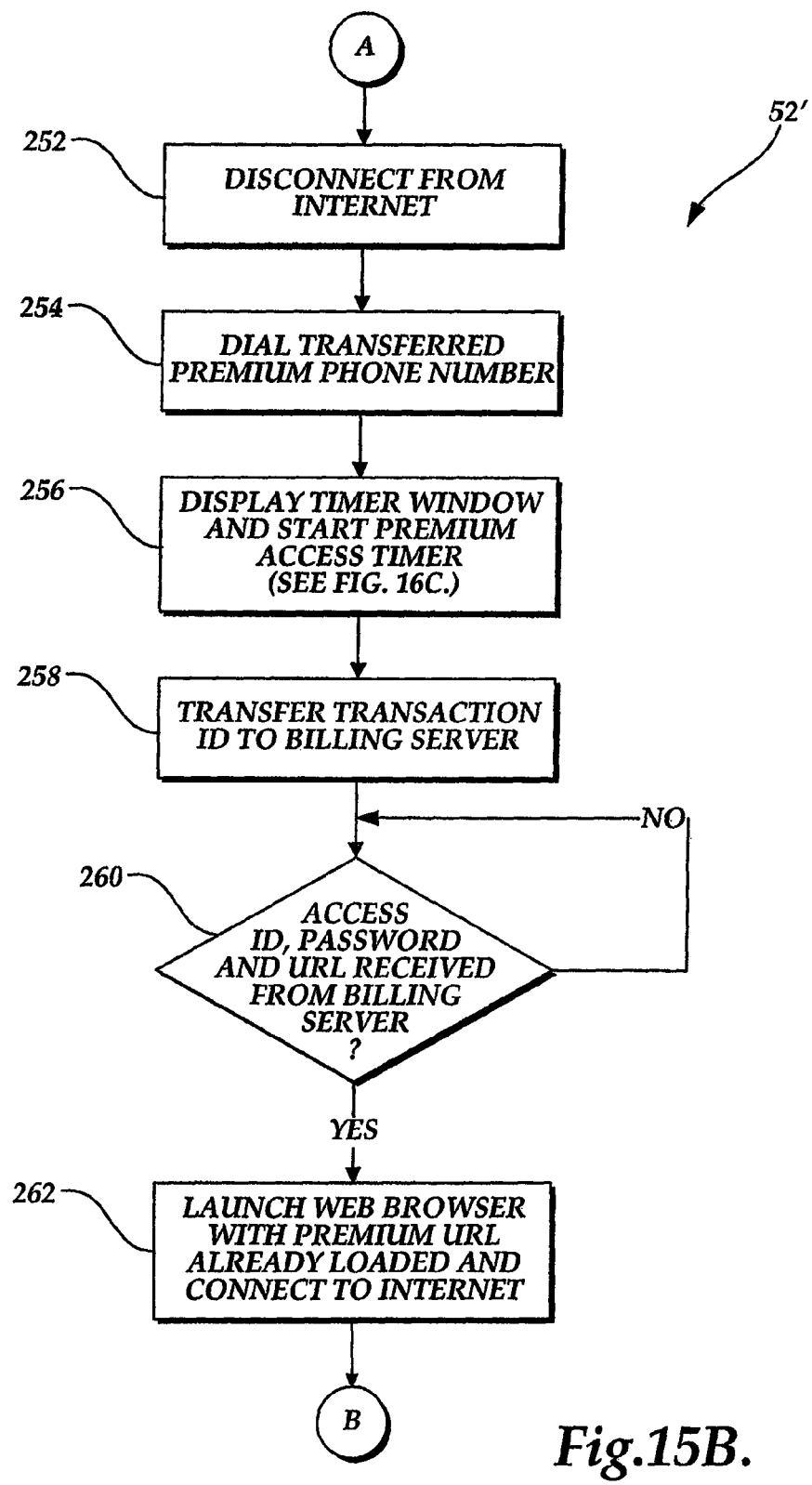
Figure 15C:
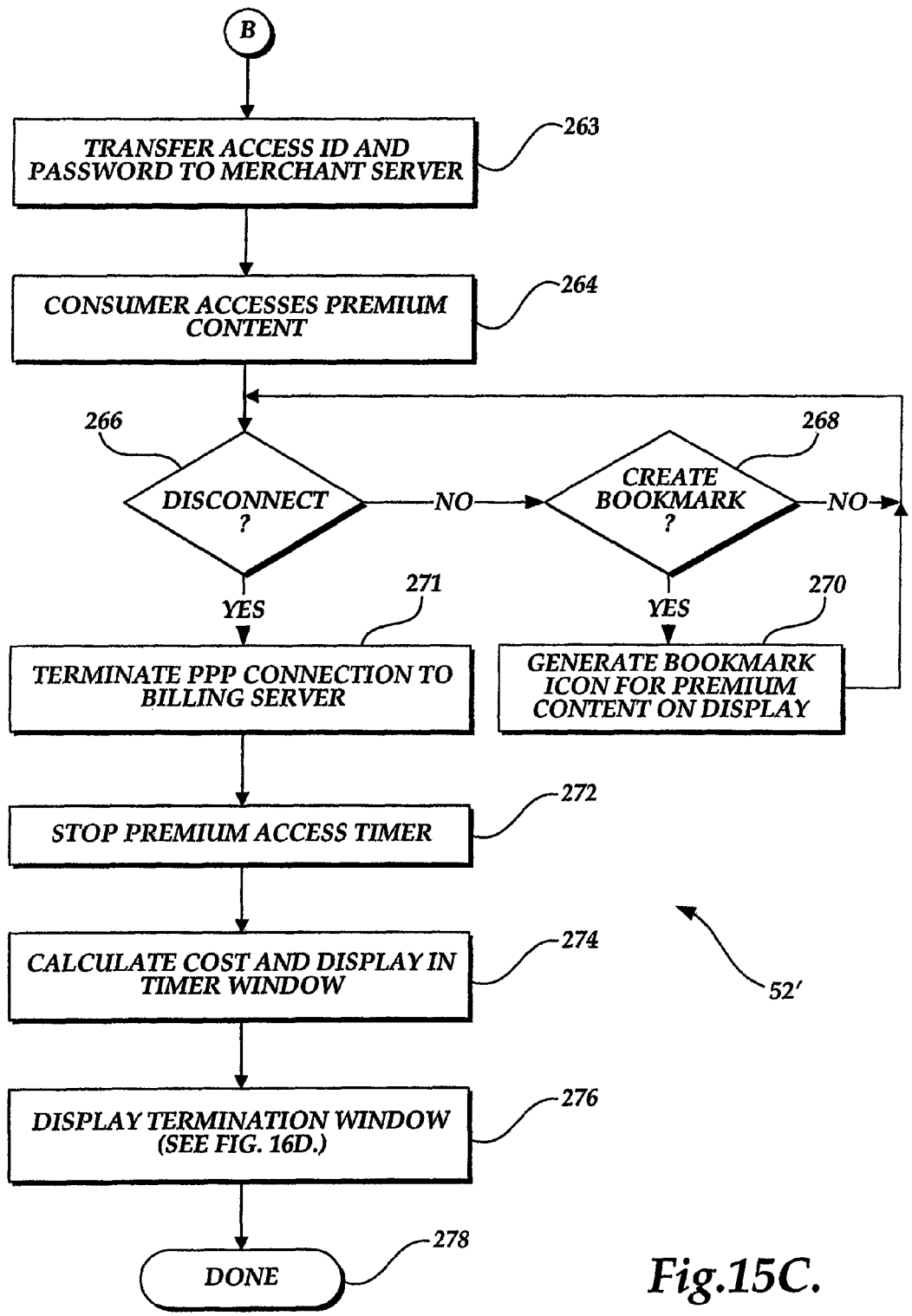
Figure 16A:
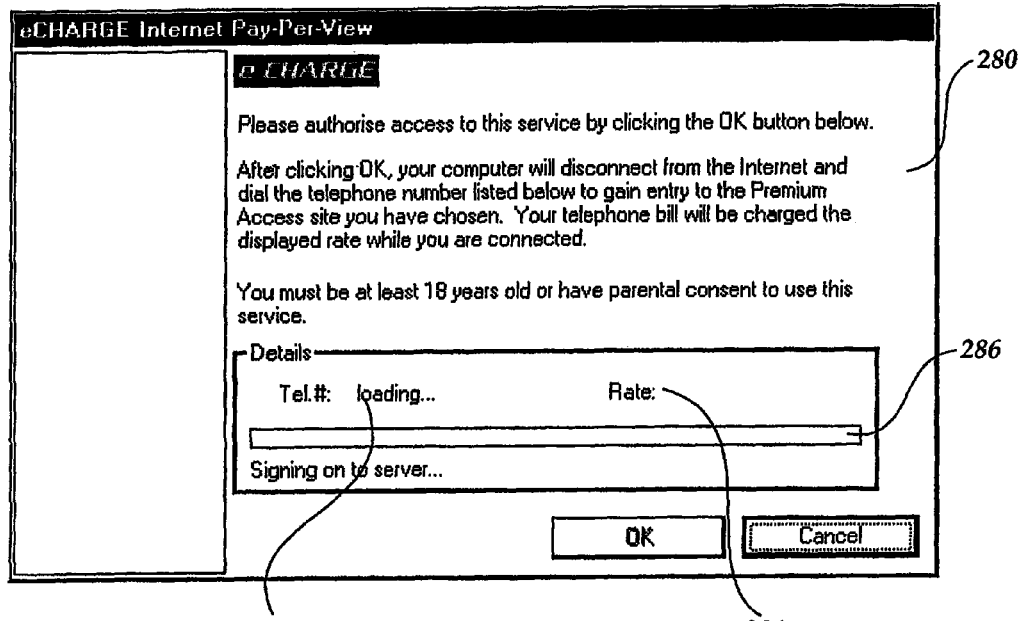
FIGS. 16A-16D are various windows produced by the consumer's computer for displaying messages associated with the order of premium content.

Once the plug-in 52' is initialized, the plug-in 52' performs the logic depicted in FIGS. 15A-15C to place the consumer's order for premium content information with the billing server 34 using methods well-known in the art. The logic begins in FIG. 15A in a block 240 and proceeds to a block 242 in which the consumer's computer 42 establishes an Internet connection to the billing server 34. Next, in a block 244, the plug-in 52' displays a premium content access window 280 as shown in FIG. 16A on the screen 73 of the consumer's computer 42. The premium content access window 280 confirms the consumer's order for premium content and provides the consumer with the opportunity to cancel the request. If the consumer enters "OK," the logic in FIG. 15A will proceed to a block 246 where the plug-in 52' transfers to the billing server 34 a product I.D. uniquely identifying the premium content desired by the consumer and a purchaser I.D. assigned to the consumer. As will be described in more detail below, the consumer is assigned a purchaser I.D. the first time it places an order with the billing server 34. Hence, if this is the first time that the consumer has placed an order, the consumer will not have been assigned a purchaser I.D. and no such I.D. will be transferred in block 246. However, in yet other embodiments of the present invention, the consumer may be assigned the purchaser I.D. when the plug-in 52' is downloaded, thus eliminating the need for the billing server 34 to supply it later. In addition to the product I.D. and the purchaser I.D., the plug-in transfers to the billing server 34 a merchant I.D. uniquely identifying the merchant providing the premium content and the advertised rate at which the consumer will be billed for accessing the content. It will be appreciated that the merchant I.D. and advertised rate are obtained directly from the merchant Web site used by the consumer to order the premium content.

After transferring the purchaser I.D., product I.D., merchant I.D., and advertised rate to the billing server 34, the plug-in 52' waits for the billing server 34 to transfer to the consumer's computer 42 a transaction I.D. which identifies the consumer, the premium content ordered by the consumer (by product I.D.), and the billing server 34 processing the order (as noted above, there may be more than one billing server located elsewhere on the Internet 20). The consumer's computer 42 also waits for the billing server 34 to transfer a premium access telephone number and the actual premium access rate at which the consumer will be billed (since it may differ from the advertised rate). It will be appreciated that the premium access telephone number is the premium rate telephone number that the consumer's computer uses to establish a point-to-point (PPP) connection to the billing server 34 and the number by which the consumer is billed per minute (or other time interval) for accessing the premium content. As will be described in more detail below, once the PPP connection is established, the consumer is allowed to download the desired premium content from the merchant server 39 and billing at the actual premium rate begins.

Figure 16B:
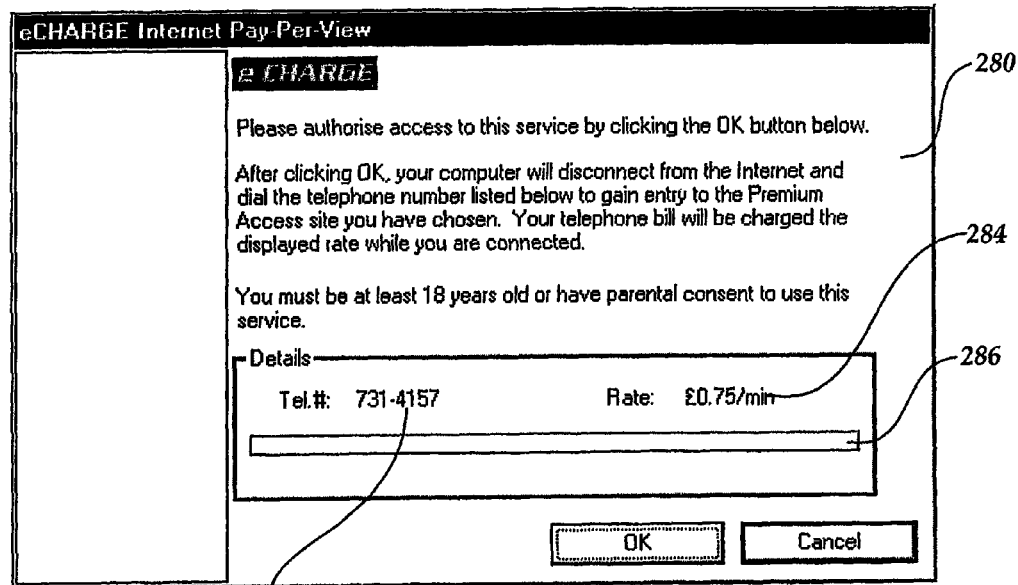

Once the transaction I.D., premium telephone number and actual premium rate are received by the plug-in 52', the plug-in 52' displays the premium content access window 280 as completed with the premium telephone number and actual premium rate received from the billing server 34 in a premium telephone number field 282 and a rate field 284, respectively, as shown in FIG. 16B. Once the consumer depresses the OK button indicating his or her desire to continue with the order for premium content, the plug-in 52' disconnects the consumer's computer 42 from the Internet 20 in a block 252 in FIG. 15B. Next, in a block 254, the plug-in 52' supplies the premium telephone number provided by the billing server 34 to the modem 49 of the computer 42 and the modem dials the number in order to establish the PPP connection to the billing server 34. As described above, the premium telephone number provided by the billing server 34 and dialed by the modem 49 of the consumer's computer 42 in the present invention is a "900 number," i.e., a ten-digit number with a 900 area code, assigned by the billing server's telephone service provider. As those of ordinary skill in the telephone switching arts will appreciate, the 900 area code has been generally reserved for commercial purposes, wherein the consumer is generally charged a flat rate or a particular rate per minute for a telephone call, and a portion of that charge is paid by the telephone service provider to the merchant to whom the 900 number is assigned. It will be recognized, however, that other types of telephone numbers may be used and, in fact, mandated by the telephone service provider without departing from the scope of the present invention.

Returning to block 254, the CSTA monitor 36 is not necessary in the present embodiment of the invention to establish a PPP connection to the billing server 34.

Figure 16C:
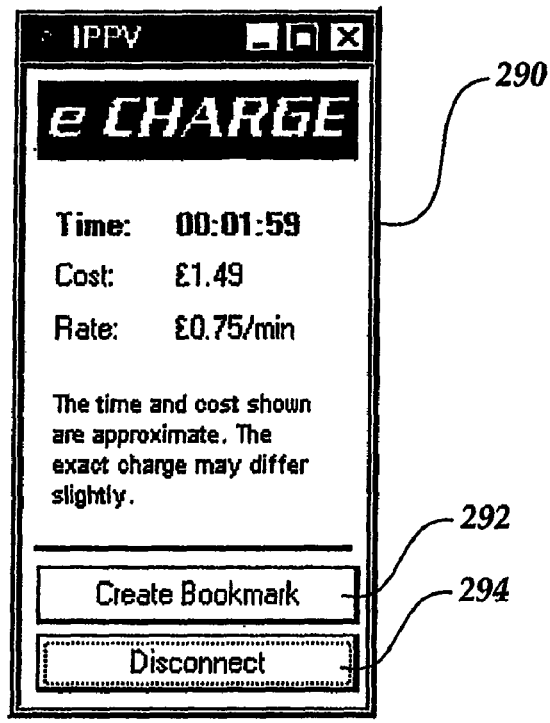

Instead, the premium telephone call placed by the modem 49 of the consumer's computer 42 is answered by the telephone switch 40 connected to the access server 38, which notifies the billing server 34 directly of the incoming call. Accordingly, the consumer's computer establishes a PPP connection with the billing server 34 via the telephone switch 40 and access server 38. It will be appreciated that once the PPP connection is established and the free period normally associated with the premium telephone number expires, billing begins by the telephone service provider using its own internal accounting and billing procedures. Accordingly, the plug-in 52' starts a premium access timer in block 256 for keeping track of the amount of time the consumer spends accessing the premium content and displays a timer window 290, as shown in FIG. 16C on the screen 73 of the consumer's computer 42, which includes the amount of time spent by the consumer accessing the premium content, the premium rate at which the consumer is billed for viewing or accessing the premium content, and the total cost to the consumer calculated therefrom for accessing the premium content. Next, in a block 258, the plug-in 52' places the order for the premium content with billing server by transferring the previously assigned transaction I.D. to the billing server 34. It will be recognized that many consumers may be ordering premium content simultaneously, and, hence, many computers located elsewhere on the Internet 20 may be establishing PPP connections to the billing server 34 at any given time. Therefore, the transaction I.D. is necessary so that the billing server 34 may identify the consumer and the order placed by the consumer and supply the plug-in 52' installed on the consumer's computer 42 with the appropriate information for obtaining access to the premium content.

After the transaction I.D. has been transferred to the billing server 34, the logic proceeds to a decision block 260 in which it determines if the consumer's computer 42 has received in return an access I.D., password and URL from the billing server 34. As will be described in more detail below, when the billing server 34 receives an order for premium content from the consumer's computer 42, it forwards the order to the merchant server 39 of the merchant providing the premium content ordered. In response, the merchant server 39 supplies the billing server 34 with: (a) the URL for the premium content ordered; (b) a password allowing the consumer's computer to claim the ordered premium content and enter the merchant's premium Web site; and (c) an access I.D. that provides the consumer's computer 42 with access to an Internet Protocol (IP) session with the merchant server 39. If this information has not yet been received from the billing server 34, the decision block 260 is merely repeated, i.e., the plug-in 52' merely waits, until the information is received. Once received, the plug-in 52' launches the Web browser 51 with the URL for the premium content already loaded in a block 262 and the consumer's computer establishes an Internet connection to the merchant server 39 identified by the loaded URL. It will be appreciated by those of ordinary skill in the art that the Internet connection between the consumer's computer 42 and merchant server 39 is established via the billing server 34 and the access server 38 to which the billing server is connected. In other words, the LAN 24 serves as the consumer computer's gateway to the Internet 20. Once this connection is established, the consumer's computer 42 transfers to the merchant server 39 in a block 263 the password and access I.D. it has previously been given so that the merchant server 39 may allow the consumer's computer 42 access to the IP session the merchant server has designated for it. The consumer's computer 42 downloads the premium content located at the merchant's Web site, i.e., the merchant server 39, identified by the URL in a block 264 in FIG. 15C.

Figure 16D:
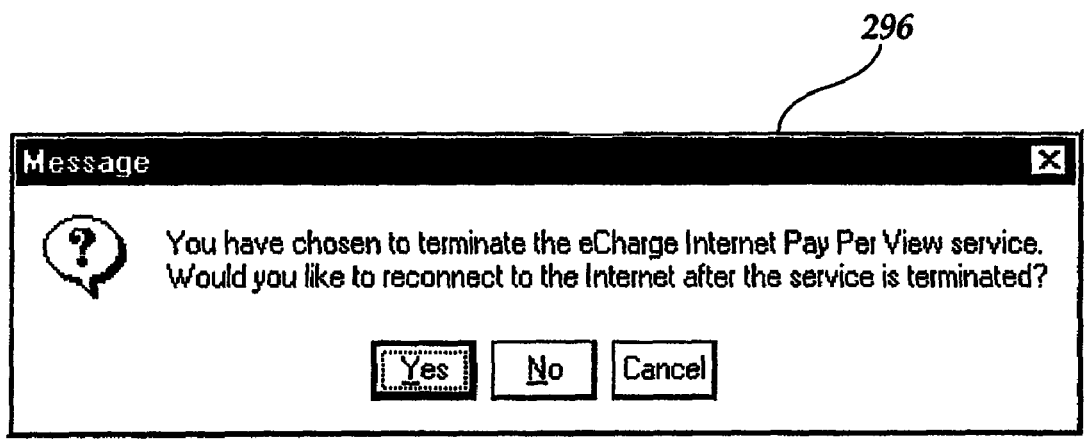

Billing continues at the premium rate as the consumer continues accessing the premium content and only terminates when the consumer chooses to disconnect from the merchant server 39 and billing server 34 by selecting a disconnect button 294 in the timer window 290 shown in FIG. 16C. In this regard, the logic determines in a block 266 if the consumer has chosen the disconnect button 294. If so, the logic proceeds to a block 271 where the PPP connection to the billing server 34 via the premium telephone line is terminated, thus also ending the consumer computer's Internet connection with the merchant server 39. It will be appreciated that once the PPP connection is terminated, billing for the use of the premium telephone number ends as well. Accordingly, in a block 272 the premium access timer is terminated, and in a block 274, the plug-in 52' calculates the total cost to the consumer for accessing the premium content by multiplying the time spent by the consumer on the premium telephone line by the actual rate. The total cost is then displayed in the timer window 290 as shown in FIG. 16C. Next, in a block 276 a termination window 296 as shown in FIG. 16D is displayed to the consumer on the display 73 of the consumer's computer in a block 276. From the termination window 296, the consumer may choose to reconnect to the Internet 20 via its normal Internet service provider. The logic of the plug-in component 52' then ends in a block 278.

Returning to decision block 266, if the consumer does not choose to disconnect from the billing server 34, the consumer may instead choose to create a bookmark to the premium Web site in case the consumer wishes to access the premium content again. If the consumer does choose to create a bookmark, a bookmark icon containing the URL for the merchant's premium Web site, the premium number associated with the premium content and the actual rate for the premium content is generated on the display of the consumer's computer for future use. If the consumer does not wish to create a bookmark or has already created a bookmark, the logic returns to block 264 so that the consumer may continue to access the premium content.

Figure 17:
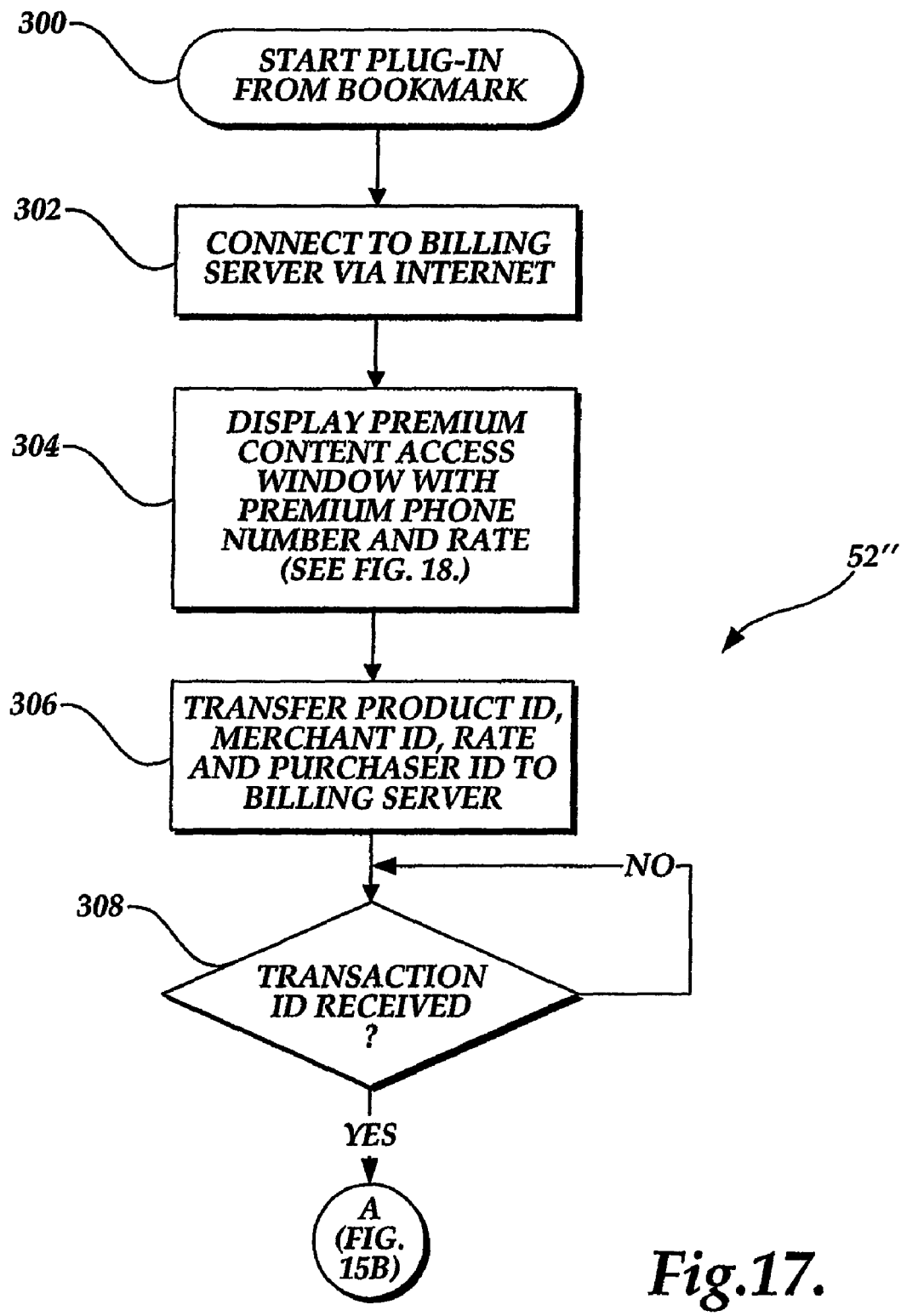
FIG. 17 is a flow chart illustrating the logic used by the consumer's computer to order previously bookmarked premium content.
Figure 18:
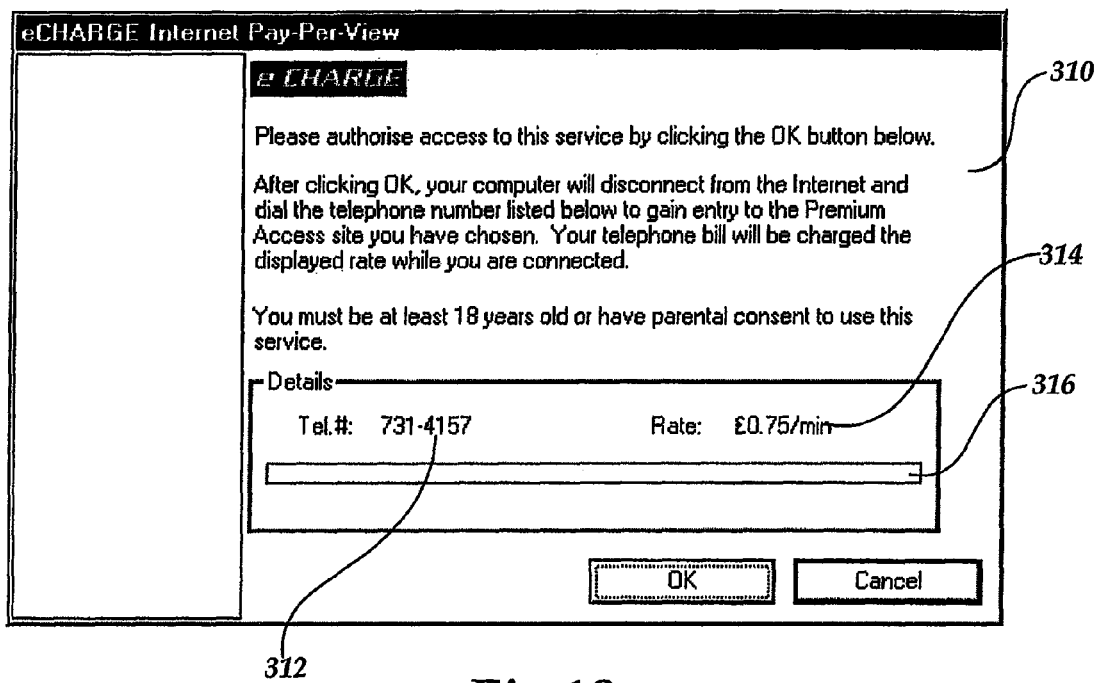
FIG. 18 is a window produced by the consumer's computer for displaying a message associated with the order of previously bookmarked premium content.

It will be appreciated that the operation of the plug-in component 52' is slightly different if the consumer chooses to access the merchant's premium Web site via the created bookmark because the plug-in component will already have in its possession the premium phone number associated with the desired premium content and the actual rate for accessing the premium content. Consequently, it is unnecessary for the plug-in component to obtain that information from the billing server 34. The logic implemented by the plug-in component when a premium content bookmark is selected by the consumer is shown in more detail FIG. 17 and denoted hereafter as plug-in component 52". The logic begins in a block 300 and proceeds to a block 302 in which the consumer's computer 42 establishes an Internet connection to the billing server 34. Next, in a block 304, the plug-in 52" displays a premium content access window 310 as shown in FIG. 18 on the screen 73 of the consumer's computer 42. The premium content access window 310 confirms the consumer's order for premium content, and displays the previously obtained premium telephone number and actual premium rate at which the consumer will be billed in fields 312 and 314, respectively. If the consumer enters "OK," the logic in FIG. 17 will proceed to a block 306 where the plug-in 52" transfers to the billing server 34, the purchaser I.D., product I.D., merchant I.D. and actual rate. The consumer's computer then waits for the billing server 34 to return the transaction I.D. for the order in a decision block 308. Once received, the logic then proceeds to block 252 on FIG. 15B such that the remaining logic shown in FIGS. 15B and 15C as described above in connection with plug-in component 52' is performed.

Figure 19:
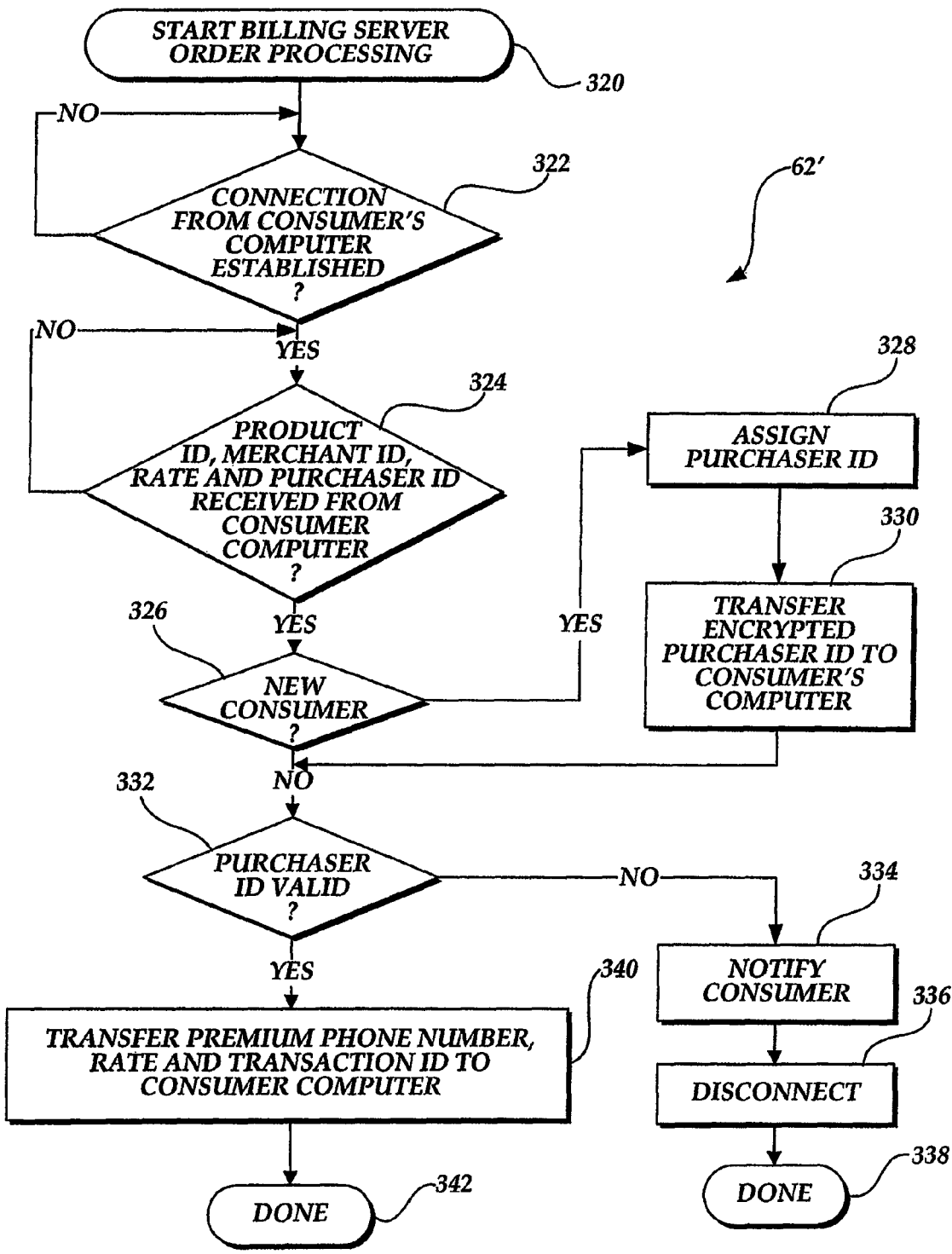
FIG. 19 is a flow chart illustrating the logic used by the billing server connected to the LAN shown in FIG. 13 to initially process the order for premium content made by the consumer's computer.

Now that the logic implemented by the plug-in components 52' and 52" have been discussed, it is necessary to describe the billing server component 62' implemented by the billing server 34 to supply the consumer's computer with the information it will require to gain access to the premium content. It will be appreciated, however, that the logic implemented by the billing server component 62' in the second embodiment of the present invention is slightly different than that described above in connection with the first embodiment. Hence, the reference number (62) for the billing server component in the second embodiment is denoted with a prime "'". As shown in FIG. 19, the logic implemented by the billing server component 62' to provide the premium telephone number begins in a block 320 and proceeds to a decision block 322 where it determines whether the connection between the consumer's computer 42 and the billing server 34 has been established via the Internet 20. If not, decision block 322 is merely repeated until such a connection has been established. Next, in a block 324, the billing server component 62' determines if the product I.D., merchant I.D., rate and purchaser I.D. have been received from the consumer's computer 42; if not, decision block 324 is repeated until such information has been received.

Once the product I.D., merchant I.D., purchaser I.D. and rate have been received, the billing server component 62' determines if the consumer is new in a decision block 326, i.e., if this is the first time the consumer has placed an order for premium content. If this is the first time, the plug-in 52' will be unable to provide the billing server 34 with the purchaser I.D. for the consumer. Accordingly, the billing server component 62' assigns the consumer a purchaser I.D. in a block 328. As noted above, the plug-in 52' will return this purchaser I.D. each subsequent time the consumer places an order. The purchaser I.D. and merchant I.D. are logged in the product and information database 64 of the billing server 34 and used for accounting, reporting and recordkeeping purposes, such as payment histories, customer demographics, account reconciliation, etc.

If the consumer is not a first-time buyer or is a first-time buyer and, thus, has been assigned a purchaser I.D., the logic proceeds to a decision block 332, where the billing server component 62' determines whether an order by this particular consumer should be denied. More specifically, the billing server 34 determines whether the purchaser I.D. is valid. If not, the consumer placing the order is notified in a block 334 and the PPP connection between the billing server 34 and the consumer's computer 42 is disconnected in a block 336. The logic then ends in a block 338. On the other hand, if the purchaser I.D. is valid, the logic proceeds from decision block 332 to a block 340 where the billing server 34 assigns a transaction I.D. to the order and transfers the transaction I.D. to the consumer's computer 42. The transaction I.D. identifies the consumer, the product ordered (by product I.D.) and the billing server 34. As noted above, the plug-in 52' installed on the consumer's computer 42 waits for this transaction I.D. before disconnecting from the Internet 20 and establishing a PPP connection with the billing server 34. The logic of FIG. 19 then ends in a block 342.

Figure 20A:
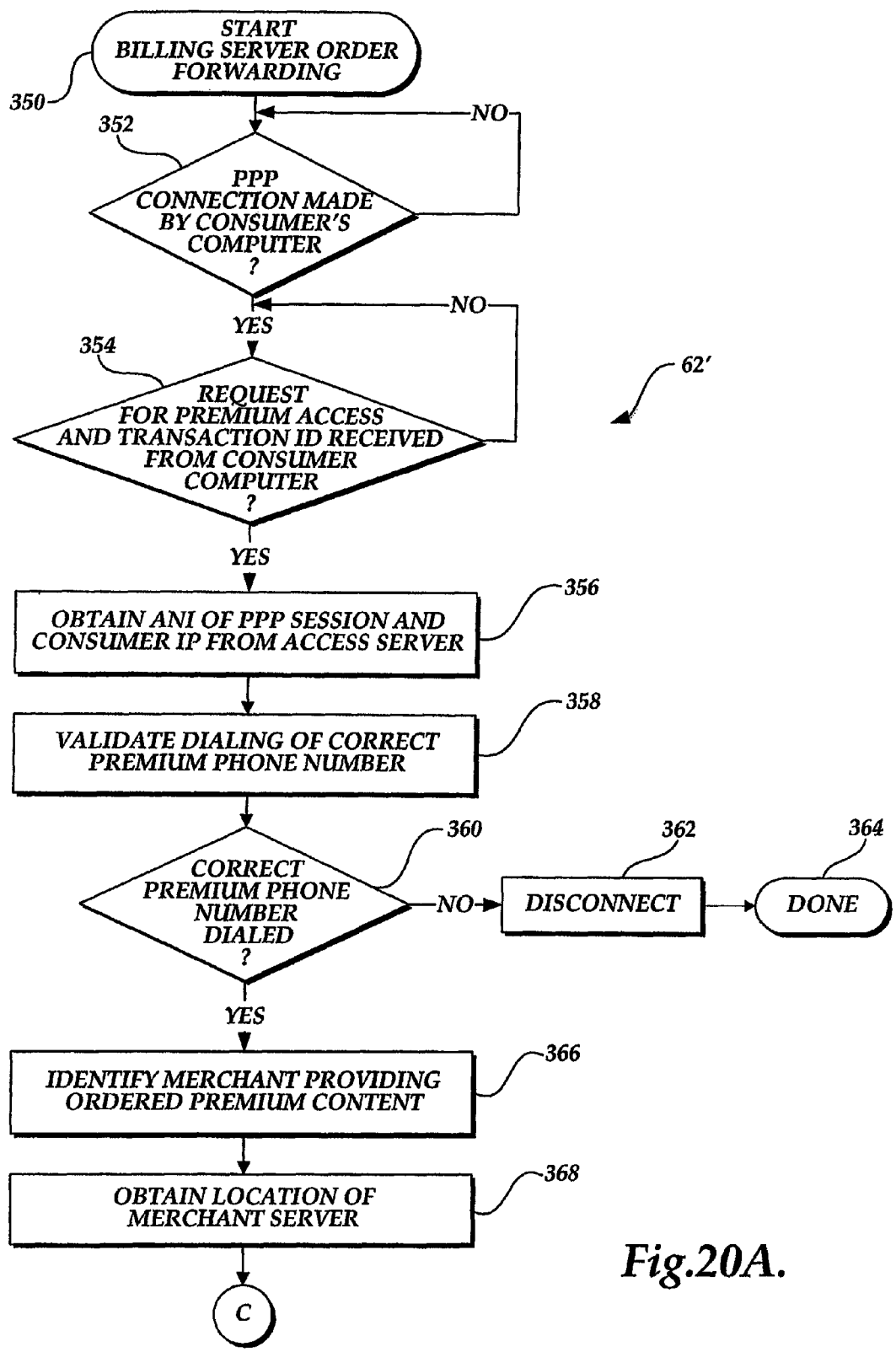
FIGS. 20A-20B are a flow chart and access to illustrating the logic used by the billing server to obtain and provide access information for the premium content to the consumer's computer.
Figure 20B:
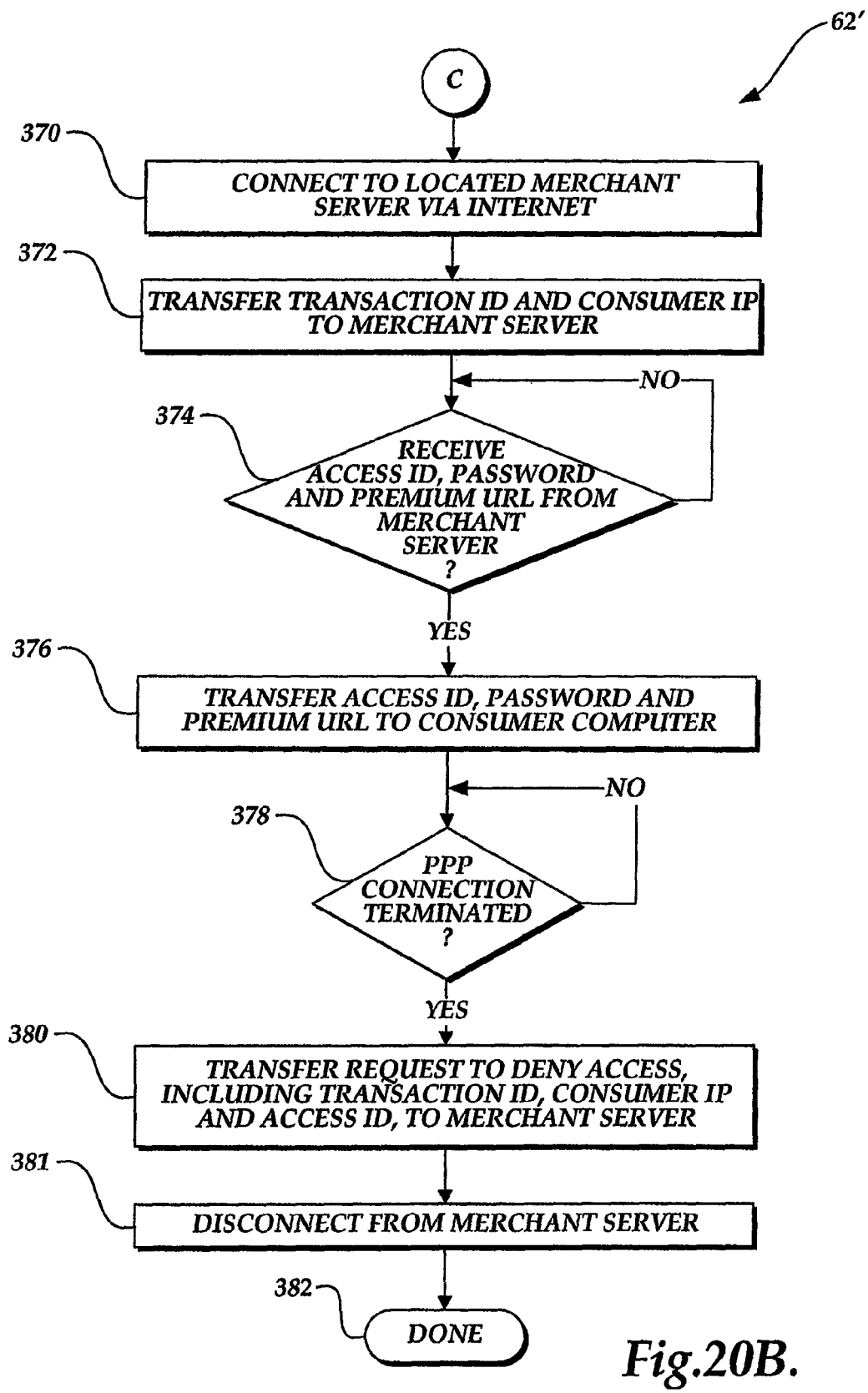

The logic employed by the billing server component 62' to obtain the information necessary for the consumer computer 42 to access the premium content from the merchant server 39 and provide the same to the consumer's computer 42 is depicted in FIGS. 20A-20B. The logic begins in FIG. 20A in a block 350 and proceeds to a decision block 352 where the billing server component 62 determines if a PPP connection has been established to the billing server 34 by any consumer computer 42 installed with the plug-in 52'. As noted above, many consumers may be placing orders at any given time, and, hence, many computers may be attempting to establish a PPP connection to the billing server 34 so that they may obtain access to the premium content they desire. Hence, decision block 352 is repeated until such a connection has been established.

Once a PPP connection has been established, the logic proceeds to a decision block 354 where it determines if the billing server 34 has received the transaction I.D. from the consumer computer signaling that the consumer's computer is requesting access to premium content. If not, decision block 354 is merely repeated until such time as the transaction I.D. is received. Once received, the logic proceeds to a block 356 where the billing server obtains the Automated Number Identification (ANI) of the PPP connection between the billing server and the consumer's computer 42 from the access server 38. The ANI is logged by the billing server 34 in the product and information database 64 and is also used for accounting, reporting and recordkeeping procedures. In addition, the billing server obtains an Internet Protocol (IP) address that was assigned to the consumer's computer 42 by the access server 38 when the PPP connection was established. As will be described in more detail below, the billing server 34 will transfer the transaction I.D. and consumer computer IP address to the merchant server 39 in order to retrieve the access information desired by the consumer.

Next, in a block 358, the billing server component 62' confirms that the consumer's computer 42 has dialed the correct premium telephone number for the desired premium content. It will be appreciated that the premium content is identified by the product I.D. and that each product I.D. is associated with a particular premium telephone number in the database of product and logged information 64 stored in mass memory 64 of the billing server 34. Consequently, the billing server component 62" determines if the premium telephone number dialed by the consumer's computer to establish the current PPP connection matches the premium telephone number associated with the premium content (i.e., product I.D.) received from the consumer's computer in decision block 354. If the correct premium telephone number has been dialed, the logic will proceed from a decision block 360 to a block 366 in which the merchant providing the ordered premium content is identified by the billing server 34. More specifically, each product I.D. identifying premium content is associated with a particular merchant, and this association is stored in the product and logged information database 67 of the billing server 34. Once the merchant has been identified in block 366, the billing server component 62' obtains the location of the merchant server 39 for the particular merchant server 39, i.e., the Internet Protocol (IP) address, which stores the premium content from the product and logged information database 67 in a block 368.

Next, in a block 370 shown in FIG. 20B, the billing server 34 establishes an Internet connection with the located merchant server 39 using the IP address obtained in block 368. Once the connection has been established, the billing server transfers the transaction I.D. and the IP address for the consumer's computer 42 to the merchant server 39 in a block 372. As will be described in more detail below, the merchant server 39 will send the billing server 34 the information necessary for the consumer computer 42 to access the premium content in response to the transaction I.D. received from the billing server 34. Accordingly, in a decision block 374 the logic determines if the billing server 34 has received an access I.D., password and URL for the premium content from the merchant server 39. If not, decision block 374 is merely repeated until such time as the billing server 34 receives this information. Once received, the billing server 34 forwards the access I.D., password and URL to the consumer's computer 42 in a block 376 so that the consumer's computer 42 may launch its Web browser 51 with the appropriate URL, establish an Internet connection to the merchant server 39 and provide the merchant server 36 with the access I.D. necessary for accessing the IP session the merchant server 39 has designated for it, and the password necessary for gaining entry to the premium content. The logic then proceeds to decision block 378 where it determines whether the consumer's computer 42 has terminated its PPP connection with the billing server 34. If not, decision block 378 is merely repeated until the PPP connection has been terminated. In other words, as long as the consumer computer 42 continues to download the premium content from the merchant server 39 and as long as the PPP connection between the computer 42 and the billing server 34 is maintained, the consumer will be billed at the actual rate supplied by the billing server 34 until the PPP connection established using the premium telephone number is terminated, i.e., until the consumer "hangs up."

Once the PPP connection between the consumer's computer 42 and the billing server 34 is terminated, the billing server 34 transfers to the merchant server 39 a request to deny the consumer computer 42 further access to the premium content, which includes the transaction I.D., the consumer computer's IP address and the access I.D. in a block 380. As will be described in more detail below, in response to this request, the merchant server 39 will deny further access to the consumer computer 42 until the consumer computer 42 re-orders the premium content and establishes a new PPP connection to the billing server 34 via a premium telephone line by which the consumer will be billed. Once the deny request is sent, the billing server 34 disconnects from the merchant server 39 in a block 381. The logic for the billing server component 62' then ends in a block 382.

Figure 21:
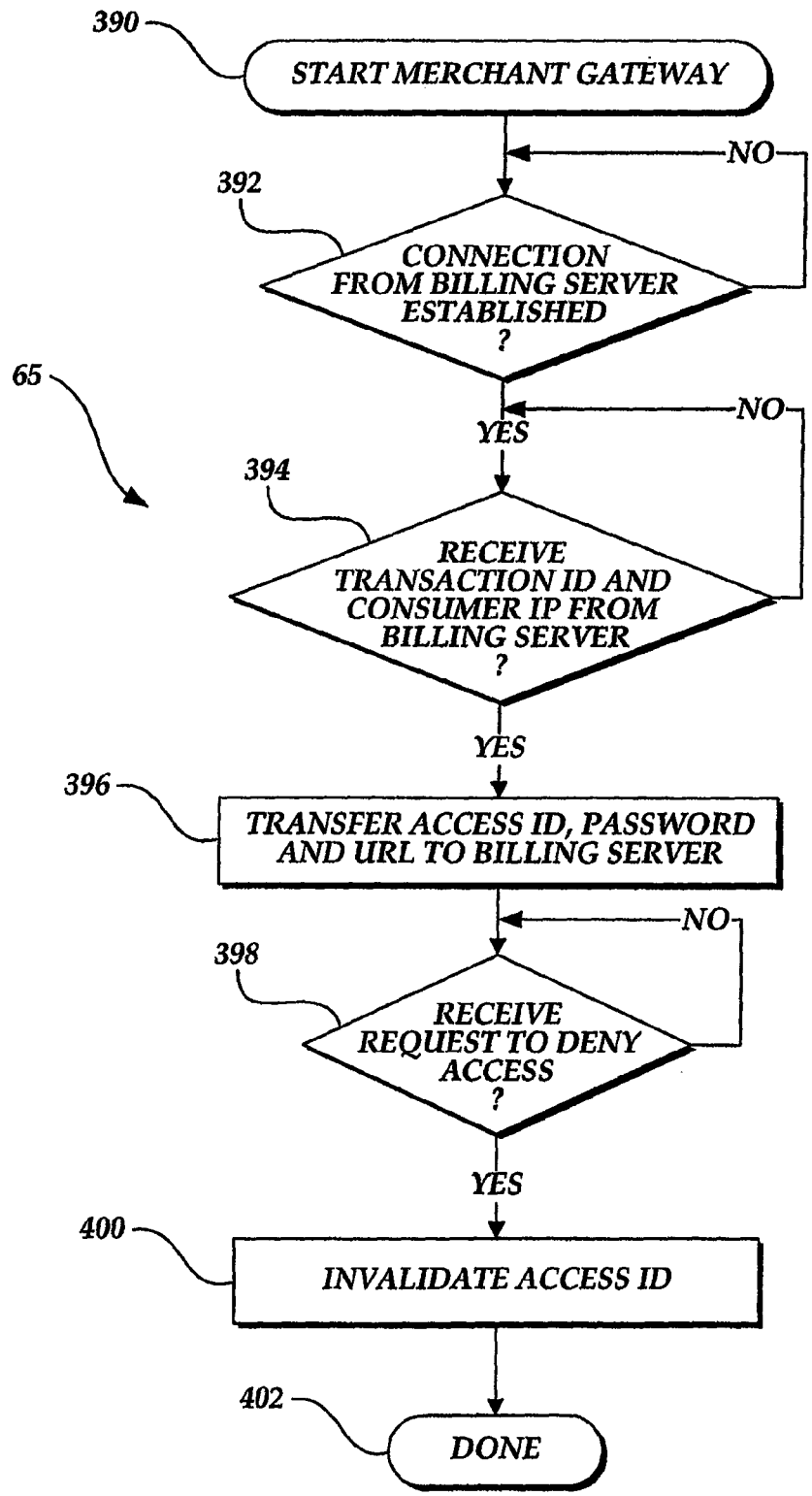
FIG. 21 is a flow chart illustrating the logic used by a merchant server to provide the billing server with the access information for the premium content.

The logic implemented by the merchant session gateway component 65 to provide the billing server 34 with access information to the ordered premium content, is shown in more detail in FIG. 21. The logic begins in a block 390 and proceeds to a block 392 where it determines if the direct Internet connection between the merchant server 39 and the billing server 34 has been established. If not, decision block 392 is merely repeated until such connection has been established. Once established, the logic proceeds to another decision block 394 in which the merchant session gateway component 65 determines if the merchant server 39 has received from the billing server 34 a transaction I.D. identifying the ordered premium content and the IP address assigned to the consumer computer 42. The consumer computer's IP address is logged in the product database 67 of the merchant server 39 and is used later by the merchant server 39 to verify that the merchant server 39 is transferring the ordered premium content to a valid IP address, i.e., to the appropriate consumer's computer.

Returning to decision block 394, if the result is negative, decision block 394 is repeated until such information is received from the billing server 34. In other words, once an Internet connection is made between the billing server 34 and merchant server 39, the merchant server 39 waits to receive a transaction I.D. for premium content from a billing server 34. Once received, the merchant session gateway component 65 transfers the URL for the ordered premium content, as well as an access I.D. and a password, to the billing server 34. It will be appreciated that in the second embodiment of the present invention described herein, each product I.D. is associated with a URL in the product database 67 of the merchant server 39. As noted above, the URL provides the location on the Internet of the premium content. It will be appreciated that the premium content may be located on the merchant server 39 implementing the present logic or on another merchant server located elsewhere on the Internet. As also noted above, the access I.D. identifies the IP session assigned by the merchant server 39 to which the consumer's computer 42 may have access so as to download the ordered premium content from the merchant server. Finally, the password is a unique string of characters that the consumer's computer 42 will eventually return to the merchant server 39 for approval to enter the premium content site.

After the merchant server 39 transfers the URL, access I.D. and password to the billing server 34, the merchant session gateway component 65 waits for an indication from the billing server 34 that the consumer has ended the premium telephone call. Accordingly, in a decision block 398, the logic determines if the merchant server 39 has received a request from the billing server 34 to deny access to the consumer's computer 42. As noted above, when the billing server 34 detects that the consumer's computer has terminated the PPP connection with the billing server and disconnected from the premium telephone line, the billing server 34 transfers the transaction I.D., consumer computer's IP address and the access I.D. originally assigned by the merchant server to the merchant server 39 in a request to deny further access to that consumer. Therefore, until such a request is received, the decision block 398 is merely repeated. It will be appreciated from the description above that while the merchant session gateway component 65 waits for the consumer's computer 42 to terminate the premium telephone call, the merchant server 39 will transfer the premium content to the consumer's computer 42 (and such transfers will be governed by the Web server component 63 of the merchant server 39) and the consumer will continue to access the premium content while being billed. Further, as noted above, as the merchant server 39 transfers and the consumer's computer 42 downloads the ordered premium content, the merchant server 39 uses the consumer IP address stored in mass memory 61 and previously transferred by the billing server 34 to verify that it is transferring each page of the ordered premium content to the correct destination, i.e., that the IP address of the consumer's computer 42 downloading the premium content matches the consumer IP address the merchant server 39 has stored in its memory.

Once the request to deny access is received, the merchant session gateway component 65 invalidates the access I.D. and consumer IP address previously given to the consumer's computer 42 so that the consumer's computer 42 can no longer gain access from the assigned IP session with the merchant server 39. Consequently, the consumer's computer 42 can no longer communicate with the merchant server and can no longer access the premium content. The logic of the merchant session gateway component 65 then ends in a block 402.

It will be appreciated by those of ordinary skill in the art that once the PPP connection between the consumer's computer 42 and the billing server 34 using a premium telephone line has been established, the telephone service provider begins billing the consumer for the duration of the premium telephone call using methods well known in the art. Once the consumer's computer terminates the PPP connection using the premium telephone number, i.e., "hangs-up," billing ceases, just as it would with any other premium telephone call. The telephone service provider then pays a service charge to the provider of the billing server 34, and pays the merchant its portion for providing the premium content.

Figure 22A:
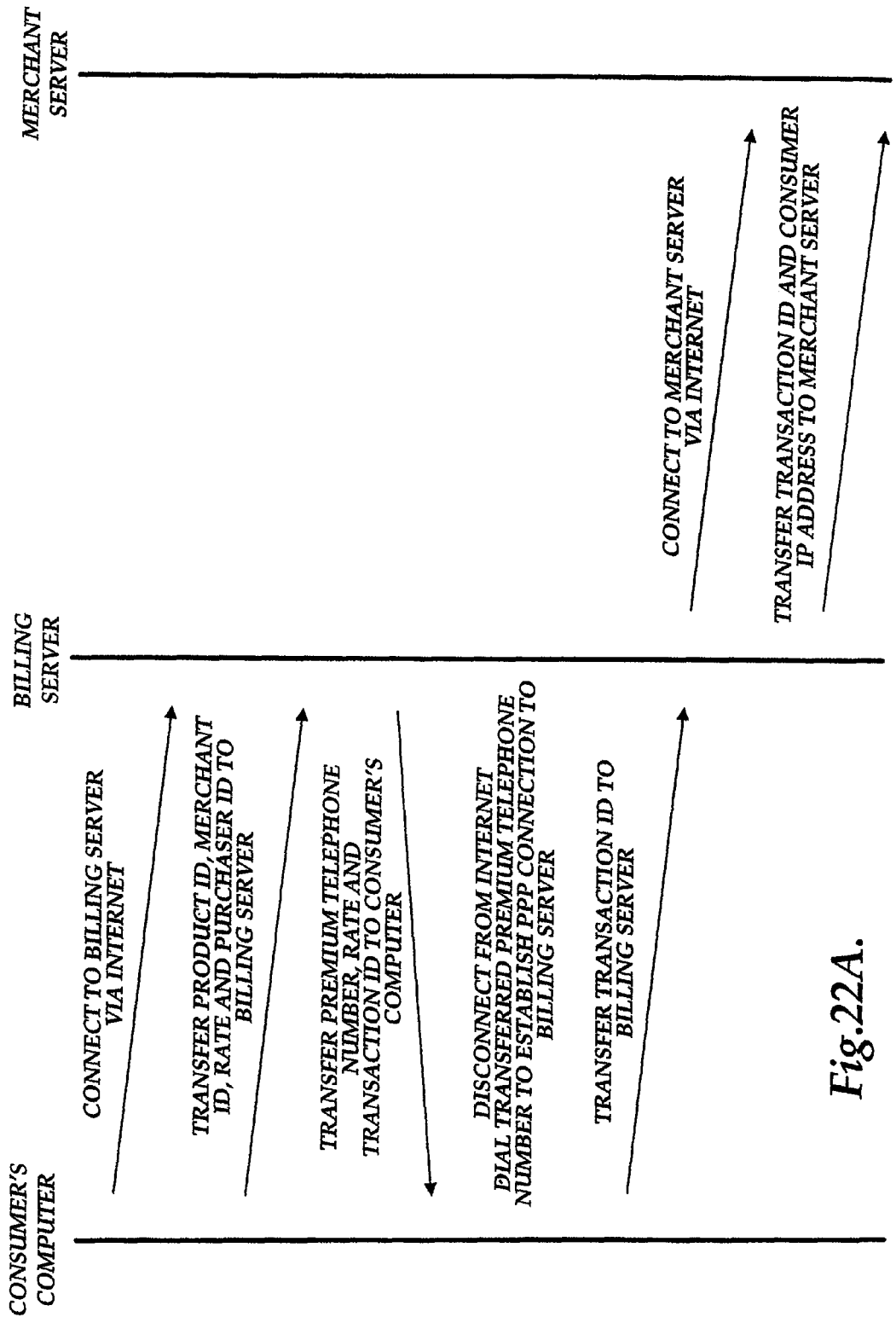
FIGS. 22A-22B are a diagram illustrating the actions taken in parallel by the consumer's computer, the billing server and the merchant server to order and provide premium content.
Figure 22B:
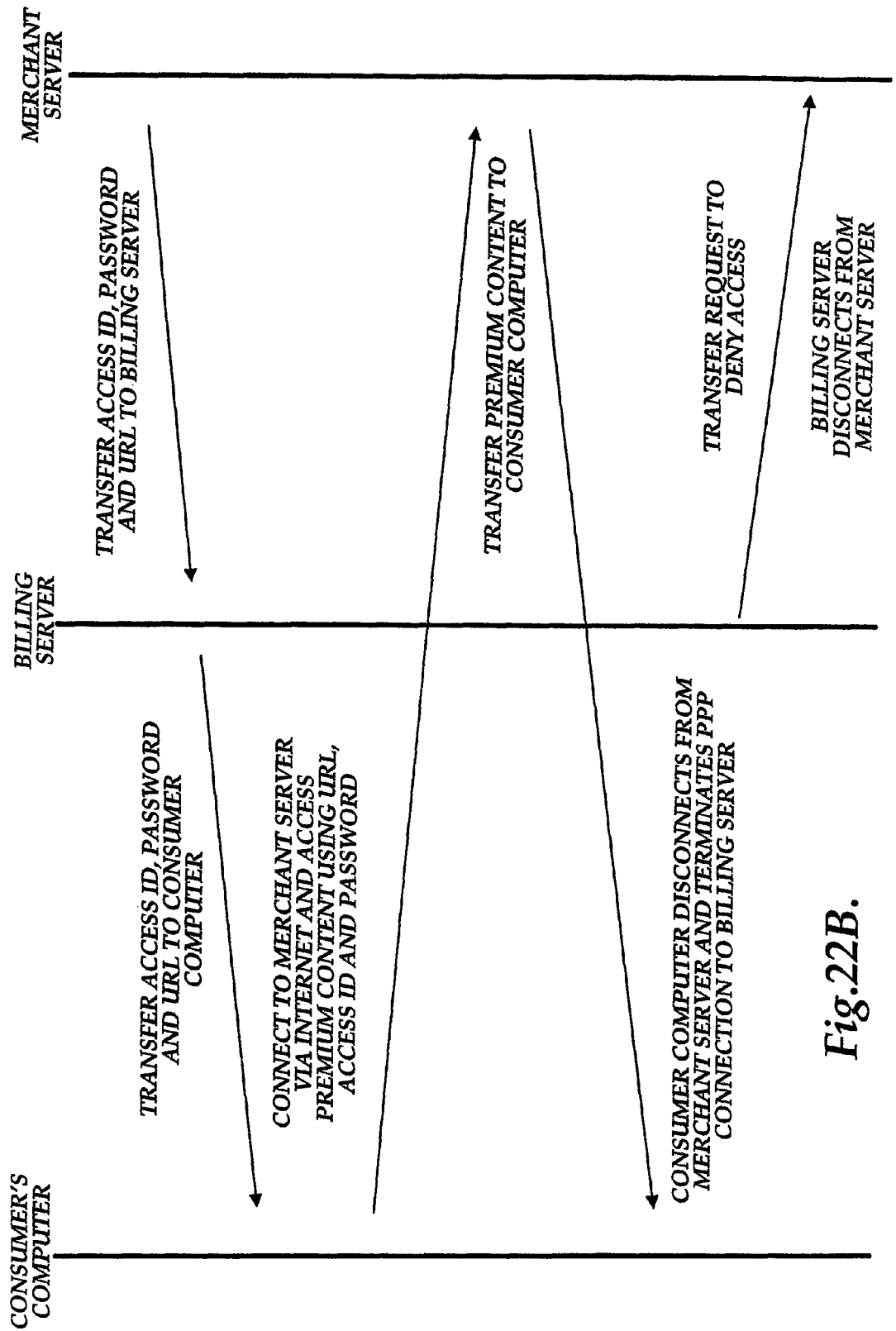

FIGS. 22A-22B are an overall diagram depicting the actions of the plug-in component 52'/consumer's computer 42, the billing server component 62'/billing server 34, and merchant session gateway component 65/merchant server 39 in parallel. Consequently, FIG. 22A depicts the consumer's computer 42 establishing an Internet connection to the billing server 34. The consumer's computer 42 then transfers the product I.D. identifying the ordered premium content to the billing server 34 as well as a merchant I.D., advertised billing rate and purchaser I.D. In response, the billing server 34 transfers a transaction I.D. identifying the order back to the consumer's computer 42. The billing server 34 also transfers the premium telephone number associated with the ordered premium content and the actual premium rate at which the consumer will be billed for accessing the premium content. Once the consumer's computer 42 has received the transaction I.D. and premium telephone number, the consumer's computer 42 disconnects from the Internet 20 and dials the premium telephone number transferred by the billing server 34 in order to establish a PPP connection with the billing server 34. Once established, billing for the consumer's time spent accessing the premium content begins and a consumer's computer 42 transfers the transaction I.D. back to the billing server 34 so that the billing server component 62' may identify the order and forward it to the appropriate merchant server 39.

Accordingly, the billing server 34 establishes an Internet connection to the merchant server 39 and transfers the transaction I.D. and consumer computer's IP address to the merchant server 39. In response, the merchant server 39 transfers to the billing server 34 the access information, i.e., an access I.D., password, and URL, which will be used by the consumer's computer 42 to locate and access the desired premium content. In turn, the billing server 34 transfers the access information to the consumer's computer 42. Once the consumer computer 42 receives the access information, the consumer's computer 42 is provided an Internet connection and locates the merchant server 39 and the premium content stored there using the URL. The consumer computer 42 then transfers the password and access I.D. it has been given to the merchant server 39. In response, the merchant server 39 transfers the ordered premium content to the consumer's computer 42. It will be appreciated that during such time, the consumer will continue to be billed for its time accessing the premium content because the PPP connection between the consumer's computer 42 and billing server 34 on a premium telephone line is maintained. However, once the consumer's computer terminates the PPP connection, the billing ends and the billing server 39 transfers a request to deny access to the premium content to the merchant server 19 so that the merchant server 19 may deny future access to the premium content to the consumer's computer 42 (unless, of course, the consumer re-orders the premium content using the plug-in component 52' or 52", as described above). The billing sever 34 then terminates it Internet connection with the merchant server 39.

While the preferred embodiment of the present invention has been illustrated and described, it will be appreciated that various changes can be made therein without departing from the spirit and scope of the invention. For example, the billing system of the present invention may be used to order products that are not electronically stored and delivered. Rather, the products are delivered by some other method, e.g., postal service, express package service, etc. In such cases, instead of providing the plug-in 52 with an encrypted product and an access key for decrypting the encrypted product, the consumer is provided with an access key or claim number that must be presented upon delivery of the product so that the consumer may claim the product. The billing system of the present invention may also be used to order products that may be used by the consumer only for a predetermined time period. For example, the consumer may purchase an hour of computer game time. In such cases, the consumer is not allowed to begin play of the game until provided an access key, which is then returned to the computer game provider.

The embodiments of the invention in which an exclusive property or privilege is claimed are defined as follows:

1. An apparatus for ordering a product via an internetwork, the internetwork formed by a plurality of computers and servers, the apparatus comprising:
  (a) a consumer's computer including a network interface for connecting to the internetwork, a processing unit coupled to the network interface, and a storage medium coupled to the processing unit, the storage medium containing program code executed by the processing unit for placing an order for the product by:
    (i) establishing a connection to a billing server via an internetwork communication link;
    (ii) transferring the order to the billing server via the internetwork communication link;
    (iii) terminating the connection to the billing server via the internetwork communication link after a transaction identifier that identifies the order placed by the consumer's computer has been received from the billing server;
    (iv) establishing a connection to the billing server via a premium-rate telephone communication link; and
    (v) transferring the transaction identifier back to the billing server via the premium-rate telephone communication link; and
  (b) a billing server including a network interface for connecting to the internetwork, a processing unit coupled to the network interface, and a storage medium coupled to the processing unit, the storage medium containing program code executed by the processing unit for processing the order for the product placed by the consumer's computer by transferring the transaction identifier, which identifies the order placed by the consumer's computer, to the consumer's computer via the internetwork communication link.

2. The apparatus of claim 1, wherein the program code executed by the processing unit of the billing server further processes the order placed by the consumer's computer by transferring an access key assigned to the order placed by the consumer's computer after the billing server receives the transaction identifier that identifies the order placed by the consumer's computer.

3. The apparatus of claim 2, wherein the program code executed by the processing unit of the billing server further processes the order for the product placed by the consumer's computer by transferring an encrypted version of the product to the consumer's computer via the internetwork communication link before the consumer's computer terminates the connection to the billing server via the internetwork communication link.

4. The apparatus of claim 3, wherein the program code executed by the processing unit of the consumer's computer further places the order by decrypting the encrypted version of the product using the access key transferred to the consumer's computer by the billing server via the premium-rate telephone communication link.

5. The apparatus of claim 2, wherein the program code executed by the processing unit of the billing server further processes the order placed by the consumer's computer by terminating the connection between the consumer's computer and the billing server via the premium-rate telephone communication link before the access key is transferred to the consumer's computer if the order placed by the consumer's computer is to be denied.

6. The apparatus of claim 1, wherein the consumer is automatically billed for the order placed by the consumer's computer by the premium communication service provider of the premium-rate telephone communication link.

7. The apparatus of claim 6, wherein the consumer's computer dials a 900 telephone number to establish the premium-rate telephone communication link.

8. The apparatus of claim 1, wherein the program code executed by the processing unit of the billing server further processes the order placed by the consumer's computer by terminating the connection between the computer and the server via the internetwork communication link before the transaction identification is transferred to the consumer's computer if the order placed by the consumer's computer is to be denied.

9. The apparatus of claim 1, wherein the program code executed by the processing unit of the billing server further processes the order for the product placed by the consumer's computer by:
  transferring to the consumer's computer via the internetwork communication link:
    (a) a premium telephone number associated with the product ordered; and
    (b) a premium billing rate associated with the product ordered and the premium telephone number.

10. The apparatus of claim 9, wherein the program code executed by the processing unit of the consumer's computer further places the order by:
  (a) terminating the internetwork communication link to the billing server after the premium telephone number and premium billing rate have been received from the billing server; and
  (b) establishing a premium communication link to the billing server using the premium telephone number.

11. The apparatus of claim 10, wherein the program code executed by the processing unit of the billing server further processes the order placed by the consumer's computer by forwarding the access information to the consumer's computer via the premium communication link.

12. The apparatus of claim 11, wherein the program code executed by the processing unit of the consumer's computer uses the access information transferred by the billing server to locate and download the ordered product.

13. The apparatus of claim 12, wherein the program code executed by the processing unit of the consumer's computer terminates the order for the product by terminating the premium communication link between the consumer's computer and the billing server after the ordered product is downloaded.

14. The apparatus of claim 13, wherein the program code executed by the processing unit of the consumer's computer calculates a charge for the ordered product based on:
  (a) the premium billing rate associated with the premium telephone number and the product ordered; and (b) the duration of the premium communication link between the consumer's computer and the billing server.

15. The apparatus of claim 13, wherein the program code executed by the processing unit of the billing server transfers a request to deny the order placed by the consumer's computer after the premium communication link between the consumer's computer and the billing server is terminated.

* * * * *